US008880451B2

(12) United States Patent
Yen et al.

(10) Patent No.: US 8,880,451 B2
(45) Date of Patent: Nov. 4, 2014

(54) FAST ALGORITHM FOR MINING HIGH UTILITY ITEMSETS

(75) Inventors: Show-Jane Yen, Taoyuan (TW);
Chia-Ching Chen, Kaohsiung (TW);
Yue-Shi Lee, Taoyuan (TW)

(73) Assignees: Yen-Yao Wang, Taipei (TW);
Show-Jane Yen, Taoyuan County (TW);
Chia-Ching Chen, Kaohsiung (TW);
Yue-Shi Lee, Taoyuan County (TW)

( * ) Notice: Subject to any disclaimer, the term of this patent is extended or adjusted under 35 U.S.C. 154(b) by 537 days.

(21) Appl. No.: 13/299,243

(22) Filed: Nov. 17, 2011

(65) Prior Publication Data

US 2012/0130964 A1  May 24, 2012

(30) Foreign Application Priority Data

Nov. 18, 2010  (TW) ................................ 99139835 A

(51) Int. Cl.
*G06F 17/00* (2006.01)
*G06N 5/00* (2006.01)
*G06Q 10/06* (2012.01)

(52) U.S. Cl.
CPC ............ *G08Q 30/02* (2013.01); *G06Q 10/0637* (2013.01)
USPC ........................................................ 706/45

(58) Field of Classification Search
None
See application file for complete search history.

(56) References Cited

U.S. PATENT DOCUMENTS 5,742,811 A * 4/1998 Agrawal et al. .................. 1/1
5,787,274 A * 7/1998 Agrawal et al. .................. 1/1
5,794,209 A * 8/1998 Agrawal et al. ............ 705/7.11

OTHER PUBLICATIONS

Agrawal et al., "Fast Algorithms for Mining Association Rules," Proc. of 20th International Conference on Very Large Databases, Santiago, Chile, (Sep. 1994), pp. 487-499.
Ahmed et al., "An Efficient Candidate Pruning Technique for High Utility Pattern Mining." Proc. of the 13th Pacific-Asia Conference on Knowledge Discovery and Data Mining, (Apr. 2009), pp. 749-756, LNAI 5476.
Han et al., "Mining Frequent Patterns without Candidate Generation." Proc. of Int. Conf. on Management of Data (ACM SIGMOD), (May 2000), pp. 1-12.
Liu et al. "A Fast High Utility Itemsets Mining Algorithm." Proc. of the 1st Int. Workshop Utility-Based Data Mining, (Aug. 2005), pp. 90-99.
Li et al., "Isolated Items Discarding Strategy for Discovering High Utility Itemsets." Data and Knowledge Engineering, (Jun. 27, 2007), pp. 198-217, vol. 64, No. 1.
Yao, et al., "Mining Itemset Utilities From Transaction Databases." Data and Knowledge Engineering, (2006), pp. 603-626, vol. 59.
Bart Goethal *Internet Reference*: "Frequent Itemset Mining Implementations Repository Datasets: Chess and Mushroom", http://fimi.cs.helsinki.fi/, (Aug. 2010).
Yen et al., "Adsorptive Mining—An Efficient Algorithm for Mining High Utility Itemsets," Proceedings of 15th Conference on Artificial Intelligence and Applications (Nov. 17, 2010), pp. 251-257.
Yen et al., "A Fast Algorithm for Mining High Utility Itemsets," Proceedings of International Workshop on Behavior Informatics—Joint with the 15th Pacific-Asia Conference on Knowledge Discovery and Data Mining Lecture Notes in Artificial Intelligence (LNAI), (May 24, 2011), pp. 171-182.

* cited by examiner

*Primary Examiner* — Kakali Chaki
*Assistant Examiner* — Luis Sitiriche
(74) *Attorney, Agent, or Firm* — Muncy, Geissler, Olds & Lowe, P.C.

(57) ABSTRACT

The present invention discloses a fast algorithm for mining high utility itemsets, wherein some transaction data and item utilities are recorded in a tree structure. The method to construct a tree structure is recording on a node the item utilities appearing from the root node to the node. Some techniques are used to reduce the mining space, whereby the fast algorithm can directly generate high utility itemsets from the tree structure without generating any candidates. The fast algorithm of the present invention is more efficient than the existing highest-efficiency algorithm. The present invention further proposes a compression method to effectively save memory space.

16 Claims, 20 Drawing Sheets

FAST ALGORITHM FOR MINING HIGH UTILITY ITEMSETS

BACKGROUND OF THE INVENTION

1. Field of the Invention

The present invention relates to a data mining algorithm, particularly to a fast algorithm for mining high utility itemsets, which is also called the absorptive mining algorithm.

2. Description of the Related Art

Data mining has been extensively applied to many fields, including business, medicine and education. However, the conventional technology of mining frequent itemsets [1] does not consider the profit or purchased quantity of each item but only pays attention to the frequency that each item appears in a transaction database. A store can learn the most popular combinations of products via mining frequent itemsets. However, the most popular products are not necessarily the highest-profit products, and the highest-profit products are usually non-popular products. For examples, milk plus bread is the most popular combination of products, which may occupy 6% in the total transactions but only contribute 1% for the total profit; the transactions include beverages and instant noodles may only occupy 2% in the total transactions but contribute as high as 7% for the total profit. Therefore, it is more favorable for the store to spend the limited marketing budget on the high-profit products than on the popular products. The combinations of high-profit products are called the high utility itemsets (HUI) thereinafter. Below are introduced some definitions to be used in the description of the present invention. Let $I=\{i_1, i_2, \ldots, i_m\}$ be the set of all the items. An itemset X is a subset of I and the length of X is the number of items contained in X. A transaction database $D=\{T_1, T_2, \ldots, T_n\}$ contains a set of transactions, and each transaction has a unique transaction identifier (TID). $T_i$ ($1 \leq i \leq n$) is one transaction thereinside and contains an itemset and the purchased quantities of the items of the itemset. The purchased quantity of item $i_p$ in a transaction $T_q$ is denoted as $o(i_p, T_q)$. The utility of item $i_p$ in $T_q$ is $u(i_p, T_q)=o(i_p, T_s) \times s(i_p)$, wherein $s(i_p)$ is the profit of item $i_p$. The utility of an itemset X in $T_q$ is the sum of the utilities of items contained in X in $T_q$, which is shown in Expression (1). If $X \not\subset T_q$, $u(X, T_q)=0$. The utility of an itemset X in D is the sum of the utilities of X in all the transactions containing X, which is shown in Expression (2). An itemset X is a high utility itemset if the utility of X in D is no less than a specified minimum utility (MU).

$$u(X, T_q) = \sum_{i_p \in X} u(i_p, T_q) \quad (1)$$

$$u(X) = \sum_{X \subseteq T_q \in D} u(X, T_q) \quad (2)$$

TABLE 1 transaction database

| TID | A | B | C | D | E | F |
|---|---|---|---|---|---|---|
| T1 | 1 | 0 | 3 | 0 | 0 | 1 |
| T2 | 0 | 4 | 0 | 5 | 0 | 0 |
| T3 | 7 | 2 | 5 | 7 | 0 | 0 |
| T4 | 0 | 1 | 0 | 0 | 4 | 0 |
| T5 | 2 | 0 | 0 | 9 | 0 | 1 |
| T6 | 0 | 0 | 5 | 0 | 7 | 0 |
| T7 | 0 | 10 | 0 | 3 | 0 | 0 |
| T8 | 0 | 2 | 2 | 0 | 3 | 0 |
| T9 | 8 | 1 | 0 | 5 | 0 | 0 |
| T10 | 0 | 5 | 2 | 3 | 0 | 0 |

TABLE 2 profit table

| Item | A | B | C | D | E | F |
|---|---|---|---|---|---|---|
| Profit($) | 7 | 2 | 5 | 1 | 10 | 13 |

For example, Table.1 is a transaction database, in which each number represents the purchased quantity for an item in a transaction. Table.2 is the profit table which records the profit for each item in Table.1. Suppose the minimum utility MU is 100. The utility of itemset $\{C, E\}$ in Table.1 is $u(\{C, E\})=(5 \times 5+7 \times 10)+(2 \times 5+3 \times 10)=135 \geq 100$. Therefore, the itemset $\{C, E\}$ is a high utility itemset. For mining frequent itemsets [1], all the subsets of a frequent itemset are also frequent itemsets, that is, there is a downward closure property for frequent itemsets. However, the property is not available for high utility itemsets since a subset of a high utility itemset is not necessarily a high utility itemset. For example, itemset $\{C, E\}$ is a high utility itemset in Table.1, but its subset $\{C\}$ s not a high utility itemset because the subset $\{C\}$ has utility $u(\{C\})=((3 \times 5)+(5 \times 5)+((5 \times 5)+(2 \times 5)+(2 \times 5)=85<100$.

Therefore, some researchers proposed a Two-Phase algorithm for mining high utility itemsets. They defined transaction utility TU and transaction weighted utility TWU for an itemset X, which are respectively shown in Expressions (3) and (4).

$$tu(T_q) = \sum_{i_p \in T_q} u(i_p, T_q) \quad (3)$$

$$twu(X) = \sum_{X \subseteq T_q \in D} tu(T_q) \quad (4)$$

If the TWU for an itemset is no less than MU, the itemset is a high transaction weighted utility itemset (HTWUI). According to Expression (4), the TWU for an itemset X must be greater than or equal to the utility of X in D. Therefore, if X is a high utility itemset, X is an HTWUI also. All the subsets of an HTWUI are also HTWUIs. Therefore, there is a downward closure property for HTWUIs. The first phase for the Two-Phase algorithm [4] is to find all the HTWUIs which are called candidate high utility itemsets by applying the Apriori algorithm [1]. The Two-Phase algorithm scans the database again to compute the utilities of all the candidate high utility itemsets and find out high utility itemsets in the second phase.

The Two-Phase algorithm would not neglect any high utility itemset. In the first phase, the Two-Phase algorithm repeatedly scans the database and searches a large number of candidate HTWUIs to generate candidate high utility itemsets.

TWU of an itemset is likely to overestimate the utility of the itemset. Especially when the minimum utility is small, a huge number of candidate high utility itemsets will be generated. In the second phase, the Two-Phase algorithm needs to scan the large database again and search a huge number of candidate high utility itemsets, which would significantly degrade the mining performance.

Some researchers were devoted to reduce the number of candidate high utility itemsets generated in the first phase of the Two-Phase algorithm, wherein the value of TWU is decreased to avoid overestimating the utility of an itemset with the downward closure thereof being kept. The technology indeed generates less candidate high utility itemsets and the Two-Phase algorithm. However, it still adopts the scheme of the Two-Phase algorithm and still needs to generate candidate high utility itemsets and scan the whole database to find the high utility itemsets.

In order to solve the problem of scanning the database repeatedly, Ahmed et al. proposed an HUC-Prune algorithm [2], which applies the FP-Growth algorithm[3] to compute the TWU of itemsets to find out candidate high utility itemsets and then scans the database and searches the candidates to find the high utility itemsets. The HUC-Prune algorithm only scans the database three times. However, it still needs to respectively generate candidate high utility itemsets and scan the whole database in two phases so as to find out the high utility itemsets. In fact, the HUC-Prune algorithm still generates too many candidate high utility itemsets.

Accordingly, the present invention proposes a fast algorithm for mining high utility itemsets to solve the problems of the conventional technologies.

SUMMARY OF THE INVENTION

The primary objective of the present invention is to provide a fast algorithm for mining high utility itemsets, wherein transaction data and item utilities are recorded in a tree structure, and wherein some techniques are used to reduce the mining space, whereby the fast algorithm can directly find out high utility itemsets from the tree structure without generating any candidate itemset, and whereby is greatly reduced the mining space and improved the overall mining efficiency, wherefore the company can achieve higher profit.

Another objective of the present invention is to provide a fast algorithm for mining high utility itemsets, which establishes a compressed absorptive tree structure to save a great amount of memory space.

To achieve the abovementioned objectives, the present invention proposes a fast algorithm for mining high utility itemsets, which comprises steps: undertaking a first database scanning process to compute a transaction weighted utility (TWU) of each item of at least one transaction database and a count of appearances of each item, and sorting the items having TWU greater than a minimal utility (MU) according to the counts of appearances from large to small, wherein if some items have an identical count of appearances, these items are sorted in alphabetic order; undertaking a second database scanning process to resort items according to a sequence of the items in a new transaction, computing a utility of each item in the new transaction, deleting items whose TWU is smaller than MU, recording all items of the new transaction and their utilities, and defining an itemset as a set of items; establishing an initial absorptive mining (AM) tree, outputting itemsets whose utilities are no less than MU as high utility itemsets; defining a itemset having a closure utility no less than MU as a high closure utility itemset, checking whether there is a high closure utility itemset whose conditional AM-tree has not been constructed yet; if there is no high closure utility itemset whose conditional AM-tree has not been constructed, terminating the process; if there is a high closure utility itemset whose conditional AM-tree has not been constructed, establishing a conditional AM-tree for the high closure utility itemset, outputting all the high utility itemsets in the conditional AM-tree, generating other possible high closure utility itemsets, and returning to the step of checking whether there is a high closure utility itemset whose conditional AM-tree has not been constructed yet, until the construction of the conditional AM-trees for all the high closure utility itemsets has been completed.

Further, the abovementioned initial AM-tree or conditional AM-tree may be a compressed AM-tree.

Below, the embodiments are described in detail in cooperation with the attached drawings to make easily understood the objectives, technical contents, characteristics and accomplishments of the present invention.

DETAILED DESCRIPTION OF THE INVENTION

The present invention discloses a fast algorithm for mining high utility itemsets, which is called the absorptive mining (AM) algorithm thereinafter. The AM algorithm also adopts the FP-tree structure, but it skillfully records some information, whereby none candidate high utility itemset is generated in the mining process. The present invention also proposes an evaluation value having a downward closure property similar to that of the transaction weighed utility TWU. Distinct from the TWU-based technology that has to compute the total utility of all the items of each transaction, the present invention considers only the utilities of the items used in the mining process. Therefore, the estimated value of utility is much smaller than TWU. Thereby is reduced the mining space of the high utility itemsets and improved the overall mining efficiency.

The tree structure for the AM algorithm is called the AM-Tree (Adsorptive Mining Tree). In the AM-tree, each child node of the root node does not record any information except the item stored in the node. Each of the nodes, which are not child nodes of the root node in the AM-Tree, records the utility accumulated along the path from the root node to the node, and a link which points to the next node recording the same item of the node (except the child node of the root node). There is also a header table recording items and the links each pointing to a node (except the child node of the root node) where one item appears in the AM-tree first time.

Figure 1:
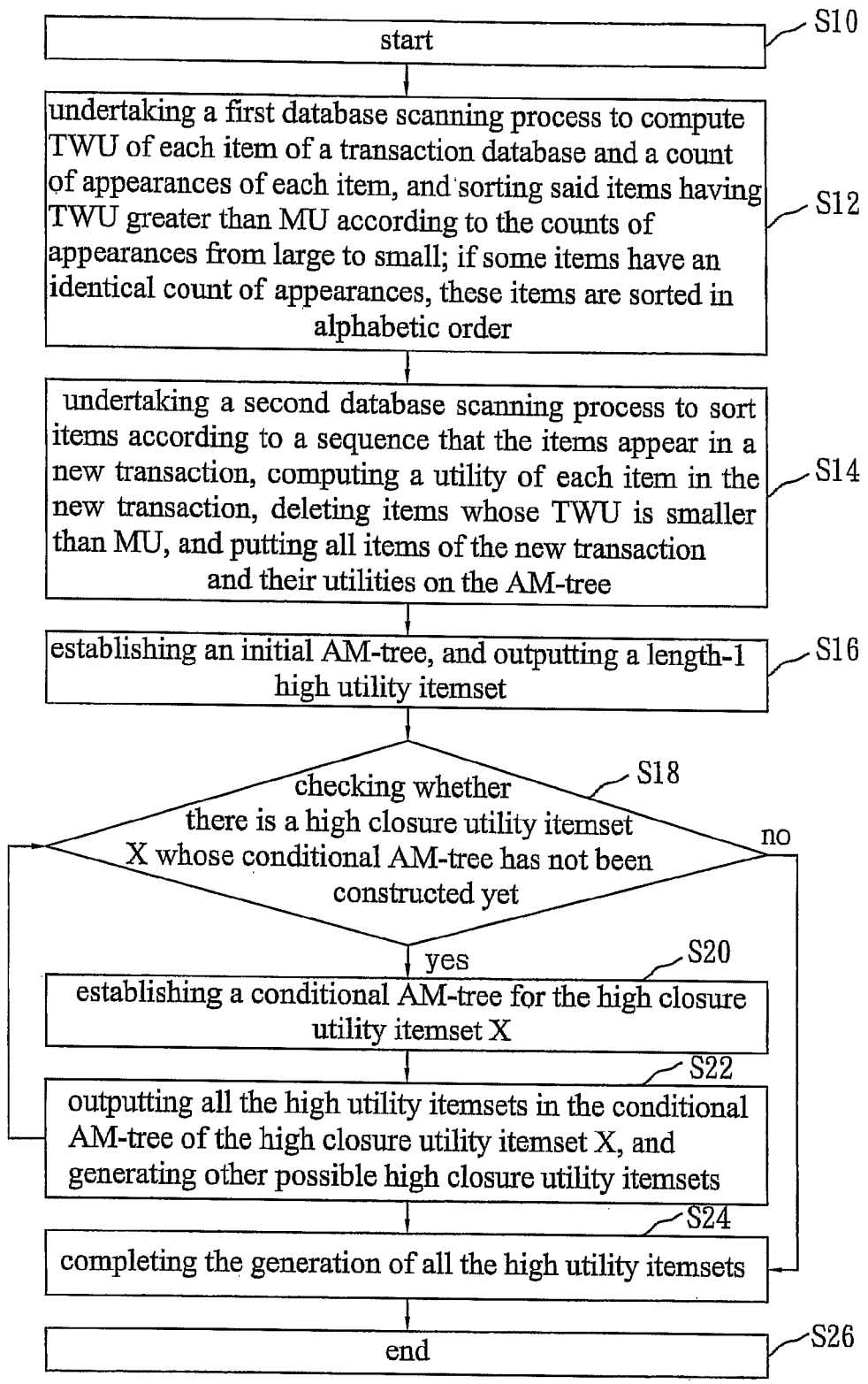
FIG. 1 shows a flowchart of the AM algorithm according to one embodiment of the present invention.

Each node, except the root node, in an AM-Tree is associated with an item. For the AM-Tree, all the child nodes of the null root node do not record any information. For each node N which is not a child node of the root node in the AM-Tree, AM needs to record the accumulated utility for every item on the path from root to node N, and a link which points to the next node (not including the child node of the root) with the same associated item as node N. FIG. 1 is the constructed AM-Tree for the transaction database in Table1. In the following, we describe how to construct an AM-Tree.

Refer to FIG. 1 showing a flowchart of the AM algorithm according to one embodiment of the present invention. In Step S10, the AM algorithm starts. In Step S12, scan the database for the first time to compute TWU of each item in at least one transaction database and the number of the appearances of each item, and sort the items having TWU greater than MU according to the numbers of appearances from the large to the small. For the items having an identical number of their appearances, sort them according to the letters of the alphabet from the former to the latter. In Step S14, scan the database for the second time, and resort the items according to the sequence of the items in a (new) transaction, compute the utility of each item in the transaction, delete the items whose TWU is smaller than MU, and record all the items of the transaction and their utilities in the AM-tree.

In Step S16, establish an initial AM-tree, output the itemsets whose utilities are no less than MU as high utility itemsets, and define the high utility itemset has a unit length. Herein, an itemset means a set of items. When an itemset has a closure utility no less than MU, the itemset is defined as a high closure utility itemset. In Step S18, examine whether there is a high closure utility itemset X whose conditional AM-tree has not been constructed yet. If the answer is yes, proceed to Step S20 and establish the conditional AM-tree of the high closure utility itemset. If the answer is no, the process proceeds to Step S24. After the conditional AM-tree has been constructed in Step S20, output all the high utility itemsets in the conditional AM-tree of the itemset X, generate other possible high closure utility itemsets in Step S22, and return to Step S18. In Step S24, all the high utility itemsets have been generated. In Step S26, the process ends.

In order to effectively save storage space, the present invention may use a compressed AM-tree to replace the initial AM-tree or the conditional AM-tree.

Below are introduced the definitions and theorems before explaining how to construct an AM-tree.

Definition.1

The transaction closure section $TCS(T_q, X)$ for an itemset $X=\{x_1, \ldots, x_n\}$ in a transaction $T_q \supseteq X$ is the union of X and all the items in $T_q$, whose order are less than that of $x_j(\forall j, 1 \leq j \leq n)$, which is shown in Expression (5) wherein $x_1$ is frontmost in order.

$$TCS(Tq,X)=\{i|T\hat{q} \text{ order}(i)<\text{order}(x_1)\}\cup X \qquad (5)$$

If $|TCS(Tq,X)| \neq |X|$, $TCS(T_q, X)$ is a real transaction closure section of X. For example, suppose the order of the items in a transaction $T_q=\{A, B, E, F, J, M, N\}$ is in an alphabetic order. $TCS(T_q, \{E, N\})=\{A, B, E, N\}$ is a real transaction closure section, and $TCS(T_q, \{A, B\})=\phi$ is an unreal transaction closure section.

Definition.2

The transaction closure utility $TCU(T_q, X)$ for an itemset X in a transaction $T_q$ is the sum of the utilities of all items in $TCS(T_q, X)$, which is shown in Expression (6).

$$TCU(T_q, X) = \sum_{i_p \in TCS(T_q,X) \wedge |TCS(T_q,X)| \neq |X|} u(i_p, T_q) \qquad (6)$$

Definition.3

The closure utility $CU(X)$ of an itemset X in a transaction database D is the sum of the transaction closure utilities for an itemset X in all the transactions in D, which is shown in expression (7).

$$CU_{(X)} = \sum_{X \subseteq T_q \in D} TCU(T_q, X) \qquad (7)$$

If CU(X) MU, the itemset X is a high closure utility itemset.

Definition.4

A closure superset of an itemset X having a length of k is $X \cup \{y\}$, wherein y is an item $\notin X$ and the order of y is smaller than that of $x_i(1 \leq i \leq k)$. A closure subset of an itemset X is $X-\{x_{min}\}$, wherein $x_{min}$ is the item whose order is the smallest.

The AM algorithm extends the length of a high closure utility itemset to find longer high utility itemsets by extending the itemset into its closure supersets. If $TCS(T_q, X)=X$, then there is no closure superset for X in $T_q$, that is, the itemset X cannot be extended in $T_q$. Therefore, the transaction closure utility $TCU(T_q, X)=0$.

Theorem.1

All the closure subsets of a high utility itemset must be high closure utility itemsets.

Proof:

Let $X^{k-1}$ be a closure subset of $X^k$. If $X^k$ is a high utility itemset, then $$MU \leq u(X^k) = \sum_{X^k \subseteq T_q \in D} u(X^k, T_q) =$$

$$\sum_{X^k \subseteq T_q \in D} \sum_{i_p \in x^k} u(i_p, T_q) \leq \sum_{X^k \subseteq T_q \subseteq D i_p \subset TCS(T_q, X^k)} \sum u(i_p, T_q) \leq \sum_{X^{k-1} \subseteq T_q \subseteq D} =$$

$$\sum_{i_p \in TCS(T_q, X^{k-1}) \wedge |TCS(T_q, X^{k-1}| - |X^{k-1}|} u(i_p, T_q) =$$

$$\sum_{X^{k-1} \subseteq T_q \in D} TCU(T_q, X^{k-1}) = CU(X^{k-1})$$

According to Theorem 1, we can first determine which itemsets are high closure utility itemsets, and then extend the high closure utility itemsets to obtain longer high closure utility itemsets, since only the closure supersets of a high closure utility itemset may be the high utility itemsets.

Theorem.2

All the closure subsets of a high closure utility itemset must be high closure utility itemsets.

Proof:

Let $X^{k-1}$ be a closure subset of $X^k$. If $X^k$ is a high closure utility itemset then $$MU \leq CU(X^k) =$$

$$\sum_{X^k \subseteq T_q \in D} TCU(T_q, X^K) \leq \sum_{X^{K-1} \subseteq T_q \in D} TCU(T_q, X^{K-1}) = CU(X^{k-1})$$

From Theorem 2, we can see that there is a downward closure property for high closure utility itemsets, that is, if an itemset is not a high closure utility itemset, all the closure supersets of this itemset are also not high closure utility itemsets. Therefore, the closure utility of an itemset must be greater than or equal to the utility of the closure superset thereof. Thus, the present invention uses the closure utility of an itemset to estimate the utility of the closure superset thereof. Therefore, the AM algorithm uses an item utility table to record the closure utility and utility of each itemset and implement generation of high utility itemsets.

The fundamentals of the algorithm of the present invention have been described hereinbefore. The initial AM-tree, conditional AM-tree and compressed AM-tree are to be described below.

Figure 2A:
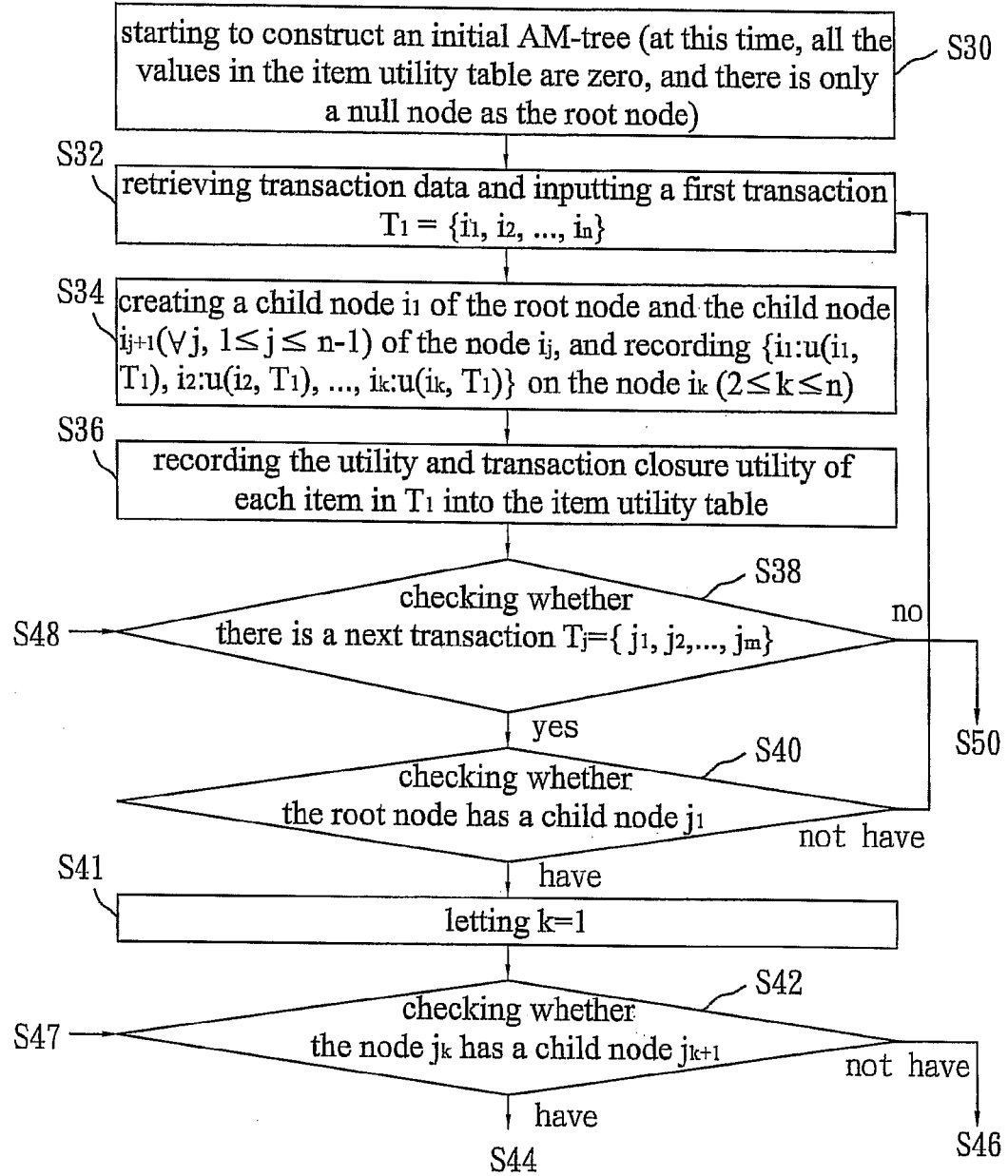
FIG. 2(a) and FIG. 2(b) show a flowchart of the process to construct an initial AM-tree according to one embodiment of the present invention.
Figure 2B:
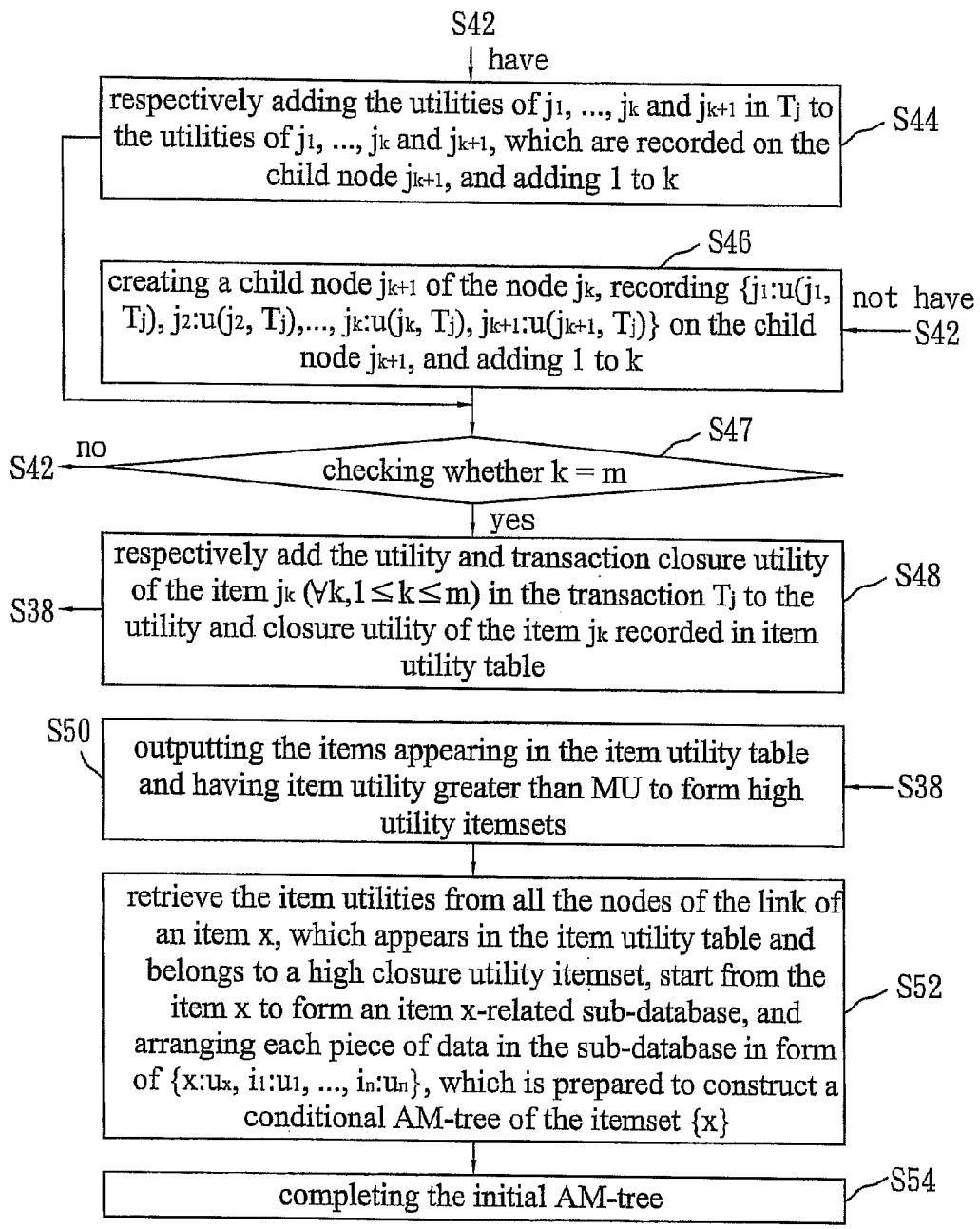

Refer to FIG. 2(a) and FIG. 2(b) showing a flowchart of the process to construct an initial AM-tree according to one embodiment of the present invention. In Step S30, start to construct an initial AM-tree. At this time, all the values in the item utility table are zero, and there is only a null node as the root node. In Step S32, put a first transaction $T_1 = \{i_1, i_2, \ldots, i_n\}$ into the AM-Tree. In Step S34, create a child node $i_1$ of the root node and the child node $i_{j+1}(\forall j, 1 \leq j \leq n-1)$ of the node and record the k (item: utility) pairs $\{i_1:u(i_1, T_1), i_2:u(i_2, T_1), \ldots, i_k:u(i_k, T_1)\}$ on the node $i_k$ ($2 \leq k \leq n$). In Step S36, record the utility and transaction closure utility of each item in $T_1$ into the item utility table. Then, the process proceeds to Step S38. In Step S38, check whether there is a next transaction $T_j = \{j_1, j_2, \ldots, j_m\}$. If the answer is no, the process proceeds to Step S50. In Step S50, output the items appearing in the item utility table and having item utility greater than MU to form high utility itemsets. If the answer is yes, the process proceeds to Step S40. In Step S40, check whether the root node has a child node $j_1$. If the root node does not have a child node $j_1$, the process returns to Step S32. If the root node has a child node $j_1$, the process proceeds to Step S41. In Step S41, let k=1. Next, in Step S42, check whether the node $j_k$ has a child node $j_{k+1}$. If the node $j_k$ has a child node $j_{k+1}$, the process proceeds to Step S44. In Step S44, respectively add the utilities of $j_1, \ldots, j_k$ and $j_{k+1}$ in $T_j$ to the k+1 (item: utility) pairs recorded on the child node $j_{k+1}$, and add 1 to k, and then the process directly proceeds to Step S47. If the node $j_k$ does not have a child node $j_{k+1}$, the process proceeds to Step S46. In Step S46, create a child node $j_{k+1}$ of the node $j_k$, and record k+1 (item: utility) pairs $\{j_1:u(j_1, T_j), j_2: u(j_2, T_j), \ldots, j_k:u(j_k, T_j), j_{k-1}:u(j_{k+1}, T_j)\}$ on the child node $j_{k+1}$, and add 1 to k, and then the process directly proceeds to Step S47. In Step S47, check whether k=m. If k≠m the process returns to Step S42. If k=m, it means that all the nodes $j_k$ have been checked, and the process proceeds to Step S48. In Step S48, respectively add the utility and transaction closure utility of the item $j_k$ ($\forall k$, $1 \leq k \leq m$) in the transaction $T_j$ to the utility and closure utility of the item $j_k$ recorded in item utility table, and the process returns to Step S38. When there is no further transaction, the process proceeds to Step S50.

After Step S50 is undertaken, the process proceeds to Step S52. In Step S52, retrieve the item utilities from all the nodes of the link of an item x, which appears in the item utility table and belongs to a high closure utility itemset, and start from the item x to form an item x-related sub-database. Each piece of data in the sub-database is in form of $\{x:u_x, i_1:u_1, \ldots, i_n:u_n\}$, which is prepared to construct a conditional AM-tree of the itemset $\{x\}$. In Step S54, the construction of the initial AM-tree is completed.

Figure 3A:
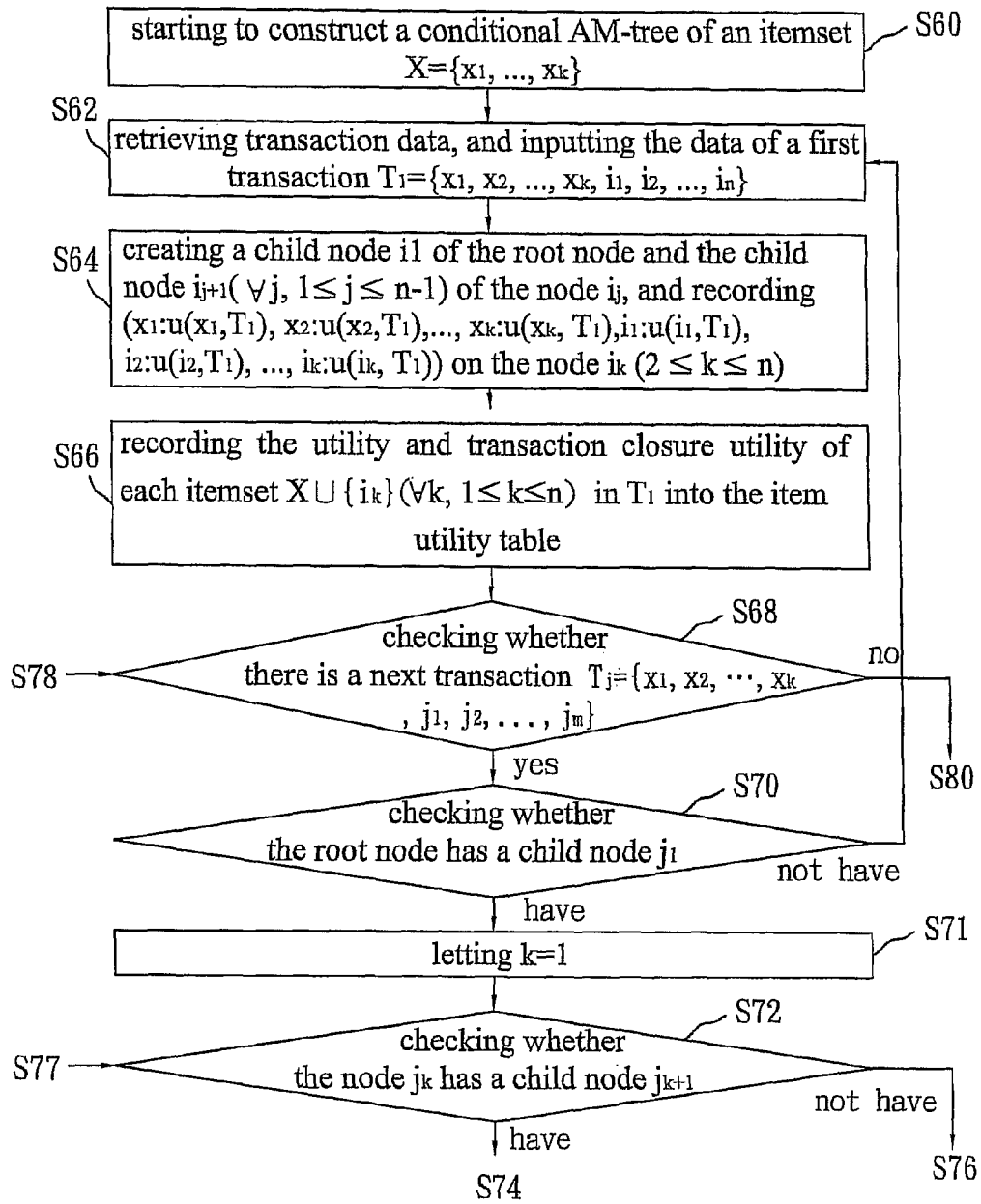
FIG. 3(a) and FIG. 3(b) show a flowchart of the process to construct a conditional AM-tree according to one embodiment of the present invention.
Figure 3B:
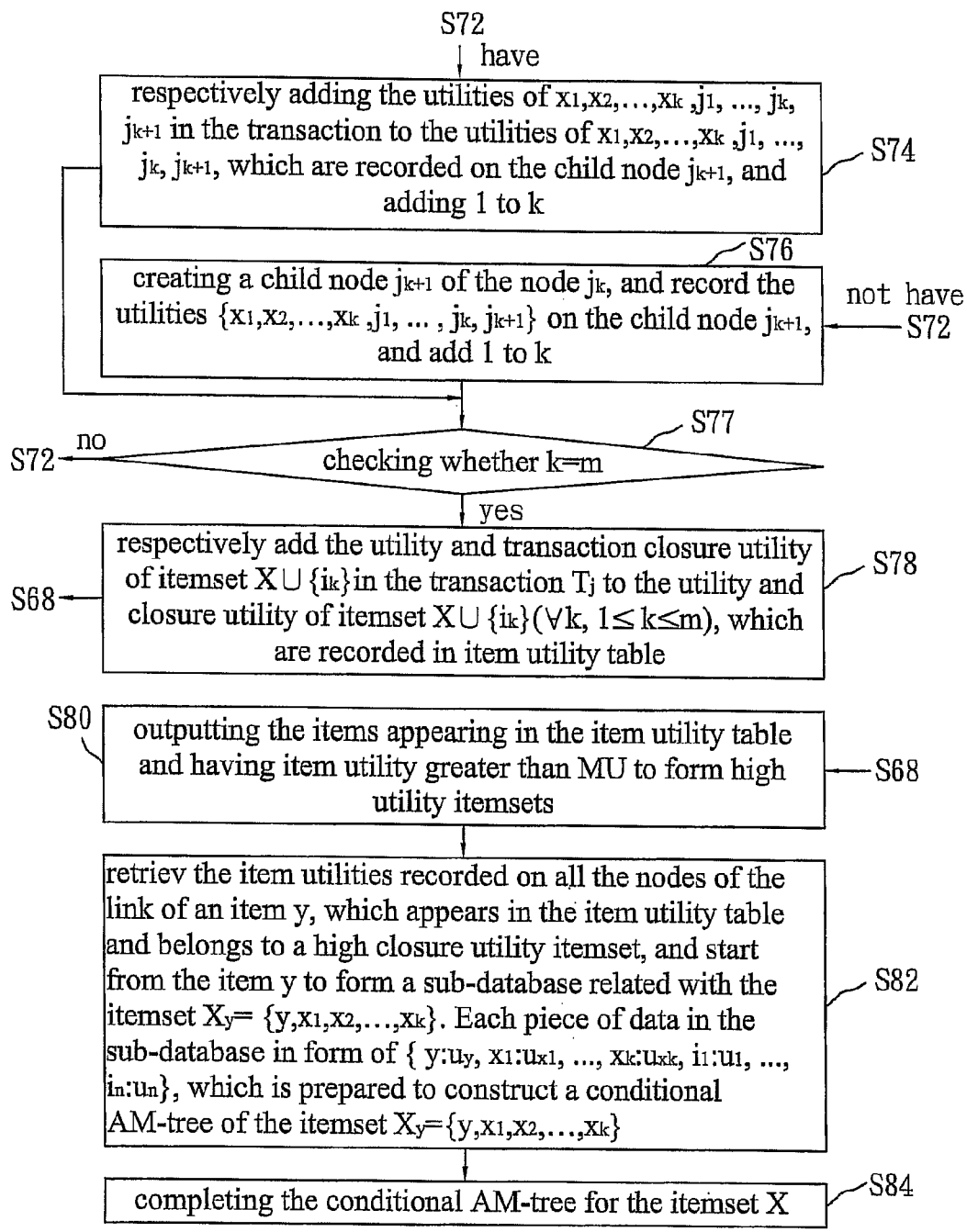

Refer to FIG. 3(a) and FIG. 3(b) showing a flowchart of the process to construct a conditional AM-tree according to one embodiment of the present invention. In Step S60, start to construct a conditional AM-tree of an itemset $X = \{x_1, \ldots, x_k\}$. In Step S62, retrieve transaction data, and put the data of a first transaction $T_1 = \{x_1, x_2, \ldots, x_k, i_1, i_2, \ldots, i_n\}$ into the conditional AM-tree. In Step S64, create a child node $i_1$ of the root node and the child node $i_{j+1}(\forall j, 1 \leq j \leq n-1)$ of the node and record $(x_1:u(x_1, T_1), x_2:u(x_2, T_1), \ldots, x_k:u(x_k, T_1), \ldots, i_k:u(i_k, T_1))$ on the node $i_k$ ($2 \leq k \leq n$). In Step S66, record the utility and transaction closure utility of each itemset $X \cup \{i_k\}$ ($\forall k$, $1 \leq k \leq n$) in $T_1$ into the item utility table. Then, the process proceeds to Step S68. In Step S68, check whether there is a next transaction $T_j = \{x_1, x_2, \ldots, x_k, j_1, j_2, \ldots, j_m\}$. If the answer is no, the process proceeds to Step S80. In Step S80, output the items appearing in the item utility table and having item utility greater than MU to form high utility itemsets. If the answer is yes, the process proceeds to Step S70. In Step S70, check whether the root node has a child node $j_1$. If the root node does not have a child node $j_1$, the process returns to Step S62. If the root node has a child node $j_1$, the process proceeds to Step S71. In Step S71, let k=1. Next, in Step S72, check whether the node $j_k$ has a child node $i_{k+1}$. If the node $j_k$ has a child node $j_{k+1}$, the process proceeds to Step S74. In Step S74, respectively add the utilities of $x_1, x_2, \ldots, x_k, j_1, \ldots, j_k$, $j_{k+1}$ in the transaction to the utilities of $x_1, x_2, \ldots, x_k$, $j_1, \ldots, j_k, j_{k+1}$, which are recorded on the child node $j_{k+1}$, and add 1 to k, and then the process directly proceeds to Step S77. If the node $j_k$ does not have a child node $j_{k+1}$, the process proceeds to Step S76. In Step S76, create a child node $j_{k+1}$ of the node $j_k$, and record the utilities $\{x_1, x_2, \ldots, x_k, j_1, \ldots j_k,$ $j_{k+1}$} on the child node $j_{k+1}$, and add 1 to k, and then the process directly proceeds to Step S77. In Step S77, check whether k=m. If k≠m the process returns to Step S72. If k=m, it means that all the nodes $j_k$ have been checked, and the process proceeds to Step S78. In Step S78, respectively add the utility and transaction closure utility of the itemset X∪{$i_k$} in the transaction $T_j$ to the utility and closure utility of the itemset X∪{$i_k$} (∀k, 1≤k≤m), which are recorded in item utility table, and the process returns to Step S68. When there is no further transaction, the process proceeds to Step S80.

After Step S80 is undertaken, the process proceeds to Step S82. In Step S82, retrieve the item utilities recorded on all the nodes of the link of an item y, which appears in the item utility table and belongs to a high closure utility itemset, and start from the item y to form a sub-database related with the itemset Xy={y, $x_1, x_2, \ldots, x_k$}. Each piece of data in the sub-database is in form of {y:$u_y$, $x_1:u_{x1}, \ldots, x_k:u_{xk}, \ldots, i_1:u_1, \ldots, i_n:u_n$}, which is prepared to construct a conditional AM-tree of the itemset Xy={y, $x_1, x_2, \ldots, x_k$}. In Step S84, the construction of the conditional AM-tree is completed.

Figure 4A:
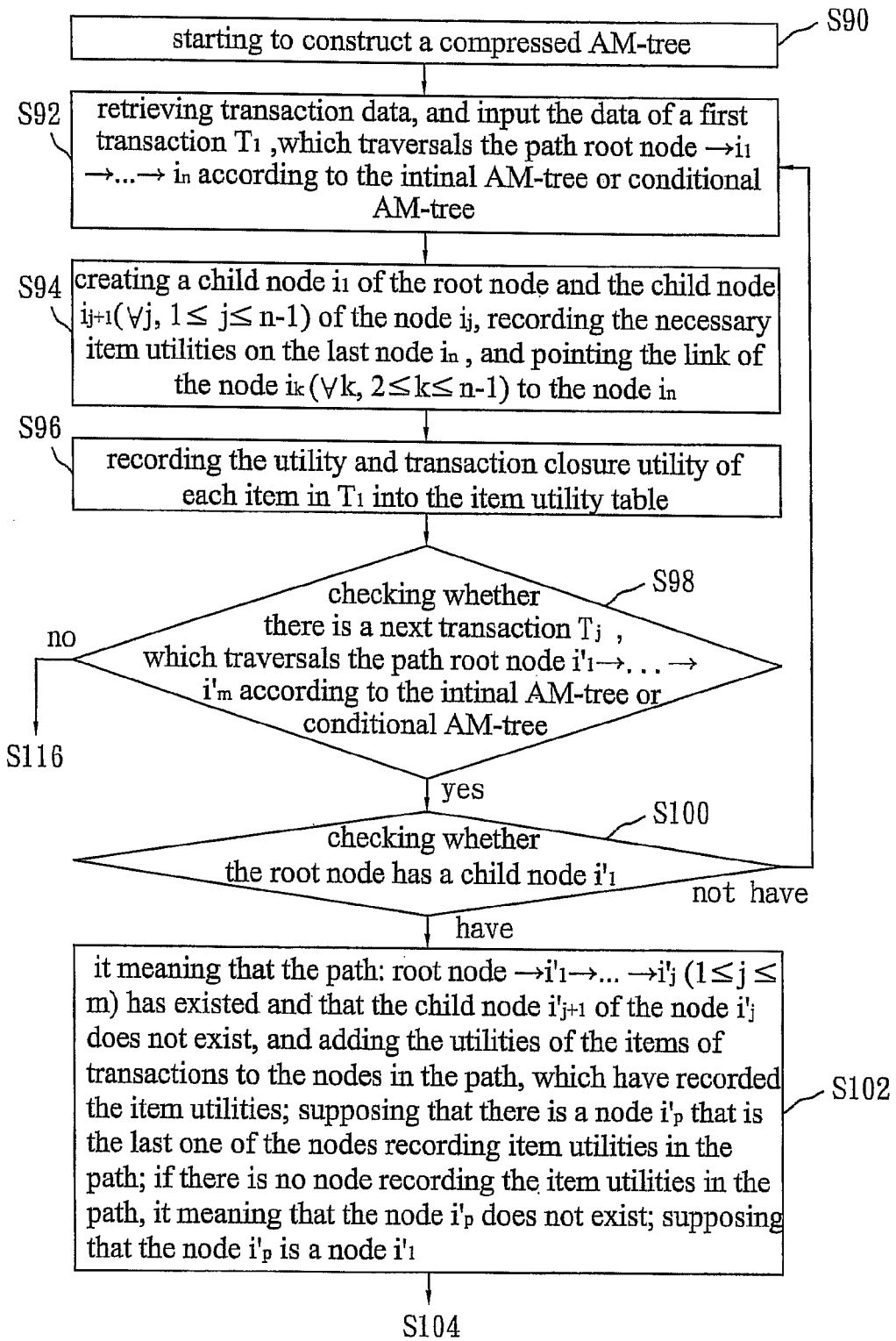
FIG. 4(a) and FIG. 4(b) show a flowchart of the process to construct a CAM-tree according to one embodiment of the present invention.
Figure 4B:
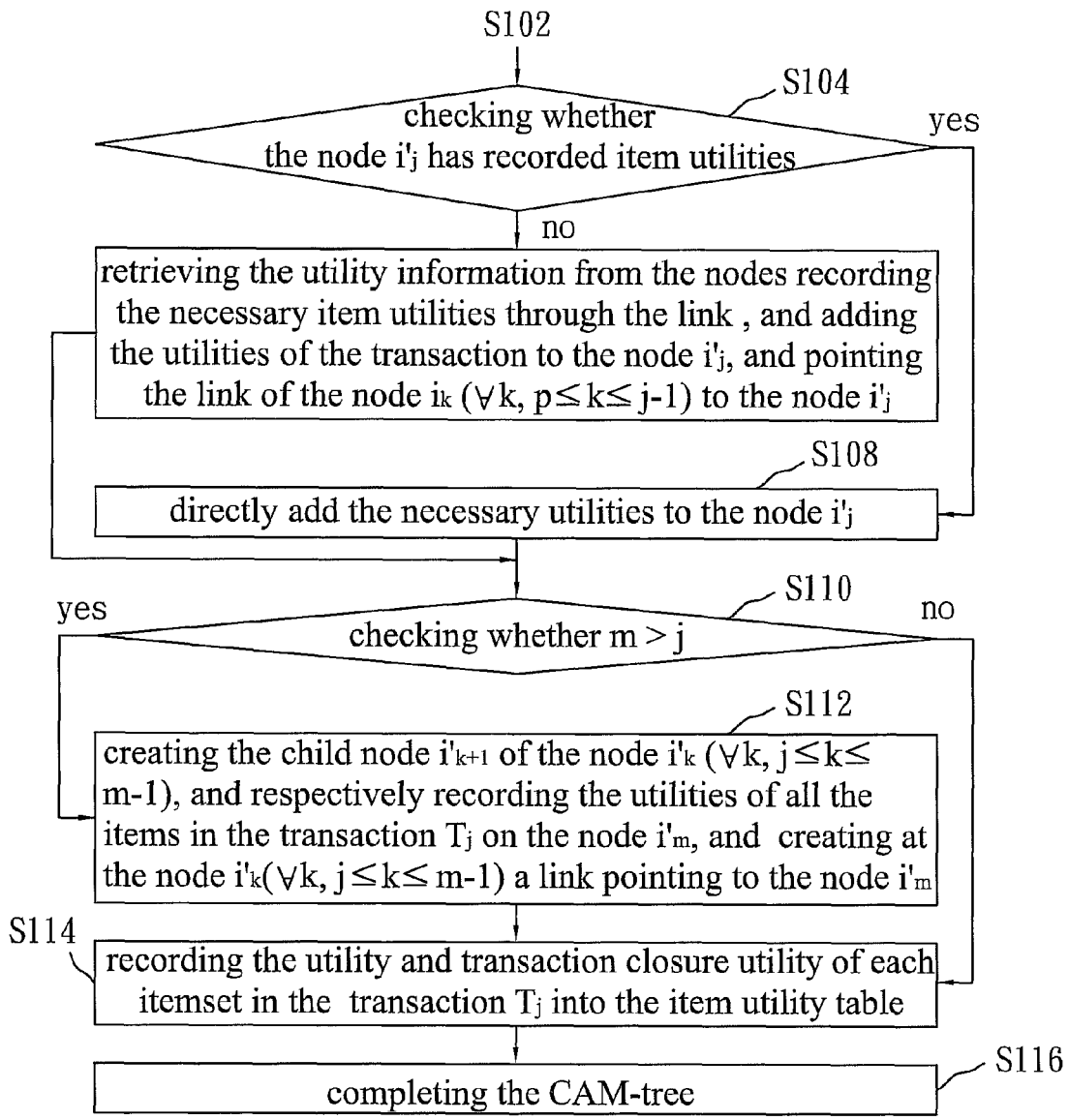

Refer to FIG. 4(a) and FIG. 4(b) showing a flowchart of the process to construct a compressed AM-tree according to one embodiment of the present invention. In Step S90, start to construct a compressed AM-tree (CAM-tree). In Step S92, retrieve transaction data, and put the data of a first transaction $T_1$, which traversals the path: root node→$i_1$→ . . . →$i_n$ according to the initial AM-tree or conditional AM-tree, into the CAM-tree. In Step S94, create a child node $i_1$ of the root node and the child node $i_{j+1}$ (∀j, 1≤j≤n−1) of the node $i_j$, and record the necessary item utilities on the last node $i_n$, point the link of the node $i_k$ (V k, 2 k n−1) to the node $i_n$. In Step S96, record the utility and transaction closure utility of each item in $T_1$ into the item utility table, and the process proceeds to Step S98.

In Step S98, check whether there is a next transaction which traversals the path: root node→$i'_1$→ . . . →$i'_m$ according to the initial AM-tree or conditional AM-tree. If the answer is yes, the process proceeds to Step S100. If the answer is no, the process proceeds to Step S116 where the CAM-tree is completed and the process ends. In Step S100, check whether the root node has a child node $i'_1$. If the root node does not have a child node $i'_1$, the process returns to Step S92 for retrieving another piece of transaction data. If the root node has a child node $i'_1$, it means that the path: root node→$i'_1$→ . . . →$i'_j$ (1≤j≤m) has existed and that the child node $i'_{j+1}$ of the node $i'_j$ does not exist, and the process proceeds to Step S102. In Step S102, add the utilities of the items of transactions to the nodes in the path, which have recorded the item utilities. Suppose that there is a node $i'_p$, that is the last one of the nodes recording item utilities in the path. If there is no node recording the item utilities in the path, it means that the node $i'_p$ does not exist. Then, suppose that the node $i'_j$ is a node $i'_p$, and the process proceeds to Step S104. In Step S104, check whether the node has recorded item utilities. If the node $i'_j$ has recorded item utilities, the process proceeds to Step S108. In Step S108, directly add the necessary utilities to the node $i'_j$. If the node $i'_j$ has not recorded item utilities yet, the process proceeds to Step S106. In Step S106, retrieve the utility information from the nodes recording the necessary item utilities through the link, and add the utilities of the transaction to the node $i'_p$, and point the link of the node $i_k$ (∀k, p<k≤j−1) to the node $i'_j$.

After Step S106 or Step S108, the process proceeds to Step S110. In Step S110, check whether m>j. If m>j, the process proceeds to Step 112. If m≯j, the process directly proceeds to Step S112. In Step S112, create the child node $i'_{k+1}$ of the node $i'_k$ (∀k, j<k≤m−1), and respectively record the utilities of all the items in the transaction $T_j$ on the node and create at the node $i'_k$(∀k, j<k≤m−1) a link pointing to the node $i'_m$. After Step S110 or Step S112, the process proceeds to Step S114. In Step S114, record the utility and transaction closure utility of each itemset in the transaction $T_j$ into the item utility table. Then, the process returns to Step S98 until there is no further transaction. In Step S116, the construction of the CAM-tree is completed.

Figure 5:
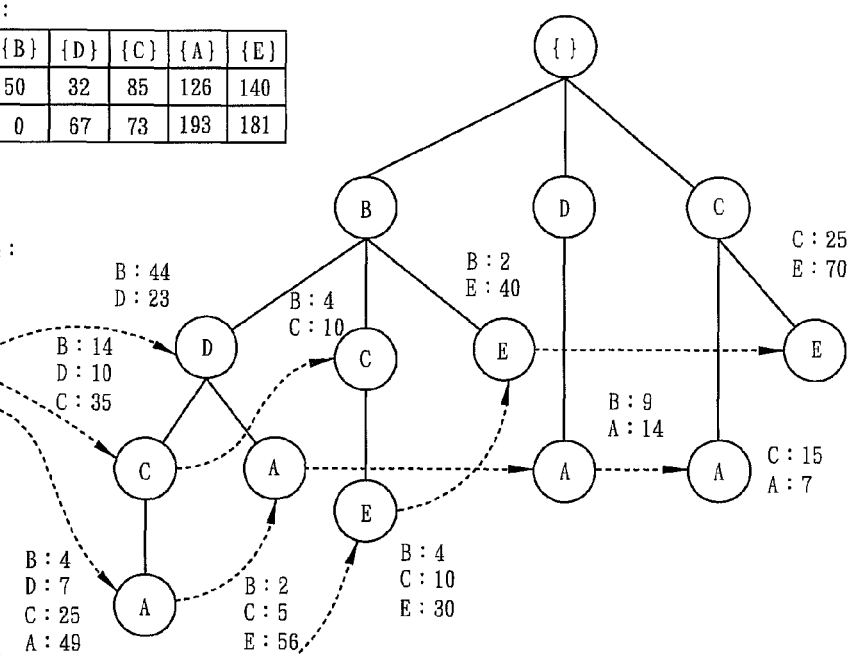
FIG. 5 shows an AM-tree constructed for all transactions in Table.1 according to one embodiment of the present invention.

Refer to FIG. 5 showing an AM-tree constructed for all the transactions in Table.1. How to construct an AM-tree and an item utility table is to be described in detail below.

Initially, all the entries of the item utility table are zero, and the AM-Tree has only a null root. When a first transaction $T_1$={$i_1, i_2, \ldots, i_n$} is put into the AM-Tree, the AM algorithm creates a child node $i_1$ of the root node and a child node $i_{j+1}$(∀j, 1≤j≤1) of a node $i_j$, and records k (item: utility) pairs {$i_1:u(i_1, T_1), i_2:u(i_2, T_1), \ldots, i_k:u(i_k, T_1)$} on the node $i_k$ (2≤k≤n). Thus are sequentially formed in the AM-tree the paths of all the items of $T_1$. By the way, the AM algorithm records the utility and transaction closure utility for each item in $T_1$ in the item utility table. In order to speed up the computation of transaction closure utility, the AM algorithm computes TCU($T_1$, {$i_j$}) (2≤j≤n) by using TCU($T_1$, {$i_{j-1}$}). Therefore, when k=2, TCU($T_1$, {$i_2$})=u($i_1$, $T_1$)+u($i_2$, $T_1$); when k≥3, TCU($T_1$, {$i_k$})=TCU($T_1$, {$i_{k-1}$})+u($i_k$, $T_1$)(k≥3). As $i_1$ is the frontmost item in $T_1$, $i_1$ has no real transaction closure section in this transaction. Therefore, there is no closure superset of {$i_1$} in $T_1$, i.e. we cannot extend {$i_1$} to generate longer high utility itemsets in $T_1$. Thus, the transaction closure utility of $i_1$ is zero in $T_1$.

For each transaction $T_j$={$j_1, j_2, \ldots, j_m$}, the AM algorithm sequentially puts each item in $T_j$ into the AM-Tree. If there is no child node $j_1$ of the root node, the method to put $T_j$ into the AM-Tree is the same as that of $T_1$. Otherwise, the AM algorithm continues to check if there is a child node $j_2$ of the node $j_1$ in the AM-Tree and so on. If there is a child node $j_{k+1}$ of the node $j_k$ (1≤k≤m−1) in the AM-Tree, the AM algorithm adds the utilities of $j_1, \ldots j_k$ and $j_{k+1}$ in $T_j$ to the k+1 (item: utility) pairs recorded on node $j_{k+1}$, respectively. If there is no child node $j_{k+1}$ of the node $j_k$(1≤k≤m−1) in the AM-Tree, the AM algorithm creates a child node $j_{k+1}$, of node $j_k$ and records k+1 (item: utility) pairs {$j_1:u(j_1, T_j), j_2:u(j_2, T_j), \ldots, j_k:u(j_k, T_j), j_{k+1}:u(j_{k+1}, T_j)$} on the node $j_{k+1}$. For each item $j_k$ (1 k m), the AM algorithm adds the u($j_k$, $T_j$) and TCU($T_j$, {$j_k$}) to the utility and closure utility for $j_k$ recorded in item utility table, respectively. The method for computing TCU($T_j$, $j_k$) is the same as that of TCU($T_1$, $j_k$).

After processing all the transactions in the database, the item utility table and AM-Tree are constructed. The utility u(x) and closure utility CU(x) for each item x are recorded in the item utility table. If u(x)≥MU, the itemset {x} is a length-1 high utility itemset. If CU(x)≥MU, the itemset {x} is a length-1 high closure utility itemset. According to Theorem 1 and Theorem 2, only the closure supersets of a high closure utility itemset may be the high utility itemsets. We can use a high closure utility itemset to generate longer high closure utility itemsets and longer high utility itemsets.

Therefore, for each length-1 high closure utility itemset {x}, the AM algorithm retrieves the (item: utility) pairs recorded on each node with item x through the link corresponding to the item x in the Header Table of the AM-Tree to form a conditional pattern base for {x}, since the union of each retrieved item and {x} is a closure superset of {x}. A {x}-related sub-database is then formed, containing the (item: utility) pairs recorded on a node x, wherein the pair (x: utility) is put on the first pair. The other pairs are ordered by the order of the items. The AM algorithm constructs a conditional AM-Tree for {x} according to A {x}-related sub-database. For each record $\{x:u_x, i_1:u_1, \ldots, i_n: u_n\}$ as a new transaction in $\{x\}$-related sub-database, the AM algorithm puts the record into the conditional AM-Tree for $\{x\}$. The method to construct a conditional AM-Tree is similar to construct an AM-Tree. The difference between them is that the AM algorithm puts the record starting at the root node of the conditional AM-Tree, that is, the root node contains itemset $\{x\}$. Besides, the utility of $\{x\}$ on a path needs to be added to each node on the path except the child node of root node $\{x\}$. By the way, the utility of itemset $\{Xi_j\}$ ($1 \leq j \leq n$) and the closure utility of itemset $\{Xi_j\}$ ($2 \leq j \leq n$) are also computed and recorded on the item utility table for $\{x\}$. After constructing conditional AM-Tree and item utility table for $\{x\}$, if the utility of $\{Xi_j\}$ is no less than MU, $\{Xi_j\}$ is a $\{x\}$-related length-2 high utility itemset. If the closure utility of itemset $\{Xi_j\}$ is no less than MU, that is, $\{Xi_j\}$ is a high closure utility itemset, the AM algorithm constructs a conditional AM-Tree and an item utility table for itemset $\{Xi_j\}$, and generates longer high utility itemsets recursively until there is no high closure utility itemset generated. Thereby, all the high utility itemsets with item x are generated.

Below, Table 1 is used to illustrate the algorithm of the present invention. Set MU to be 100. In a first database scan, the AM algorithm computes the TWU of each item in the database and the count of each item (also called the support count) and deletes the item whose TWU is less than MU. The result is shown in Table 3. The items ordered by their support counts are B, D, C, A and E. After that, the AM algorithm constructs an AM-Tree and an item utility table. At start, the AM-tree has only a null root node.

TABLE 3

| Item | A | B | C | D | E |
|---|---|---|---|---|---|
| TWU | 219 | 293 | 282 | 243 | 181 |
| Support Count | 4 | 7 | 5 | 6 | 3 |

Figure 6:
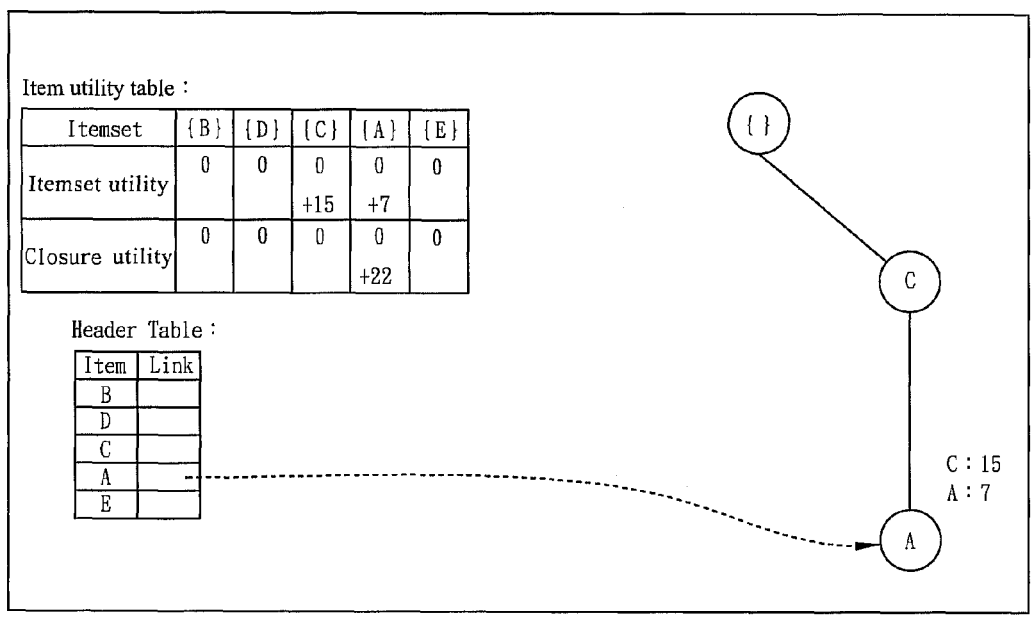
FIG. 6 shows an AM-tree and an item utility table after T1 is added according to one embodiment of the present invention.

For the first transaction $T_1$ in Table 1, the set of all the items and their utilities in $T_1$ is $\{C:15, A:7\}$. The AM algorithm computes the utility of each item in $T_1$ and gets $\{C:15, A:7\}$. Then, the algorithm creates the child node C of the null root and the child node A of the node C sequentially, and records the items and their utilities, i.e. $\{C:15, A:7\}$, in on node A. The utilities of $\{C\}$ and $\{A\}$ in $T_1$ and the transaction closure utility of $\{A\}$ in $T_1$ (i.e., $TCU(T_1, \{A\})=u(C, T_1)+u(A, T_1)=15+7=22$) are also recorded in the item utility table, which are shown in FIG. 6.

Figure 7:
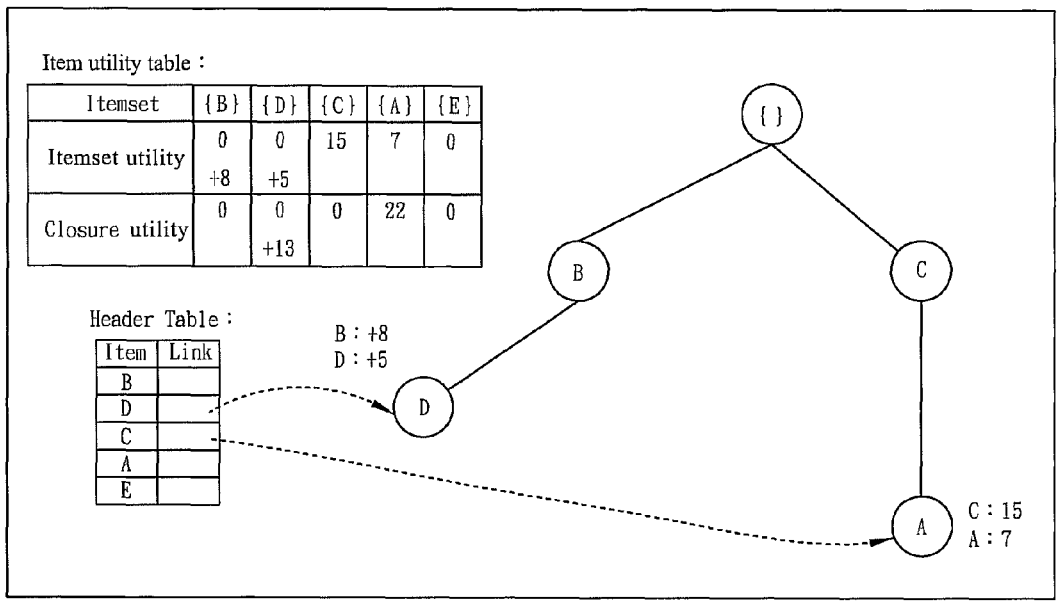
FIG. 7 shows an AM-tree and an item utility table after T2 is added according to one embodiment of the present invention.

The set of the items and their purchased numbers in a second transaction $T_2$ is $T_2=\{13:4, D:5\}$. The set of the utilities of the items is $\{B:8, D:5\}$. Since there is no child node B for the root node, the child node B of the root node and the child node D of node B are created. The utilities of items B and D in $T_2$ $\{B:8, D:5\}$ are recorded on the node D. The closure utility of $\{D\}$ in $T_2$ (i.e. $TCU(T_2, \{D\})=u(B, T_2)+u(D, T_2)=8+5=13$) and the utilities of B and D in $T_2$ are recorded in the item utility table, as shown in FIG. 7.

Figure 8:
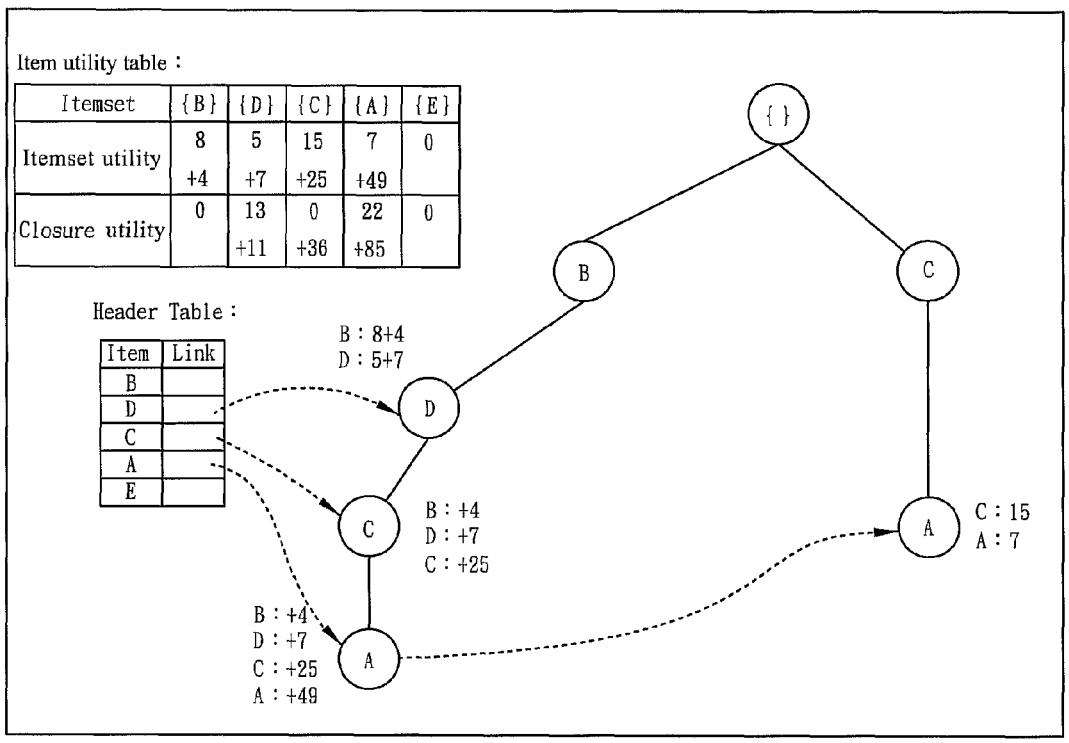
FIG. 8 shows an AM-tree and an item utility table after T3 is added according to one embodiment of the present invention.

For a third transaction $T_3$ in Table 1, the set of the items and their purchased numbers is $T_3=\{13:2, D:7, C:5, A:7\}$. The set of items and their utilities in $T_3$ is $\{B:4, D:7, C:25, A:49\}$. Since there have been a child node B for the root node and a child node D for the node B in the AM-Tree, the AM algorithm does not create nodes B and D. The AM algorithm respectively adds the utilities of B and D in $T_3$ to the utilities of B and D recorded on the node D. Since there is no child node C for the node D and no child node A for the node C, the AM algorithm creates a child node C of node D and a child node A of the node C, and respectively records the utilities of B, D and C in $T_3$ and the utilities of B, D, C and A in $T_3$ on node C and A. The transaction closure utilities of D, C and A in $T_3$ (i.e., $TCU(T_3, \{D\})=u(B, T_3)+u(D, T_3)=4+7=11$, $TCU(T_3, \{C\})=TCU(T_3, \{D\})+u(C, T_3)=11+25=36$, $TCU(T_3, \{A\})=TCU(T_3, \{C\})+u(A, T_3)=36+49=85$) and the utilities of items B, D, C and A in $T_3$ are also respectively added to the closure utilities and utilities of these items in the item utility table, as shown in FIG. 8.

Similarly, the AM algorithm processes transactions $T_4$-$T_{10}$ in Table 1, using the same way. The constructed AM-Tree and item utility table are shown in FIG. 5. From the item utility table in FIG. 5, we can see that itemset $\{A\}$ and $\{E\}$ are length-1 high utility itemsets, since their utilities are no less than MU. The AM algorithm continues to construct conditional AM-Trees for itemsets $\{A\}$ and $\{E\}$ since itemsets $\{A\}$ and $\{E\}$ are high closure utility itemsets.

For the construction of the conditional AM-Tree for $\{A\}$, the AM algorithm retrieves the (item: utility) pairs recorded on each node with item A through the corresponding link of the item A in the Header Table shown in FIG. 5. After moving the pair with item A to the first pair on each node, the generated sub-database for $\{A\}$ is $\{(A:49, B:4, D:7, C:25), (A:56, B:2, D:5), (A:14,D:9), (A:7,C:15)\}$. Then, the AM algorithm constructs the conditional AM-Tree of $\{A\}$ with $\{A\}$ being the root node.

Firstly, the AM algorithm puts the first record of the sub-database of the itemset $\{A\}$ into the AM-tree to construct a path A→B→D→C with the root node $\{A\}$, and records $\{A:49, B:4, D:7\}$ on the node D and $\{A:49, B:4, D:7, C:25\}$ on the node C. The utilities of itemsets $\{AB\}$, $\{AD\}$ and $\{AC\}$ in the first record are respectively 49+4=53, 49+7=56 and 49+25=74. The closure utilities of itemsets $\{AB\}$, $\{AD\}$ and $\{AC\}$ in the first record are respectively 0, 49+4+7=60 and 60+25=85. As B is the child node of the root node A, the itemset $\{AB\}$ has no real transaction closure section in the record. Therefore, the closure utility of the itemset $\{AB\}$ is zero. After the four records have been processed, the conditional AM-Tree and item utility table for the itemset $\{A\}$ are shown in FIG. 9.

Figure 9:
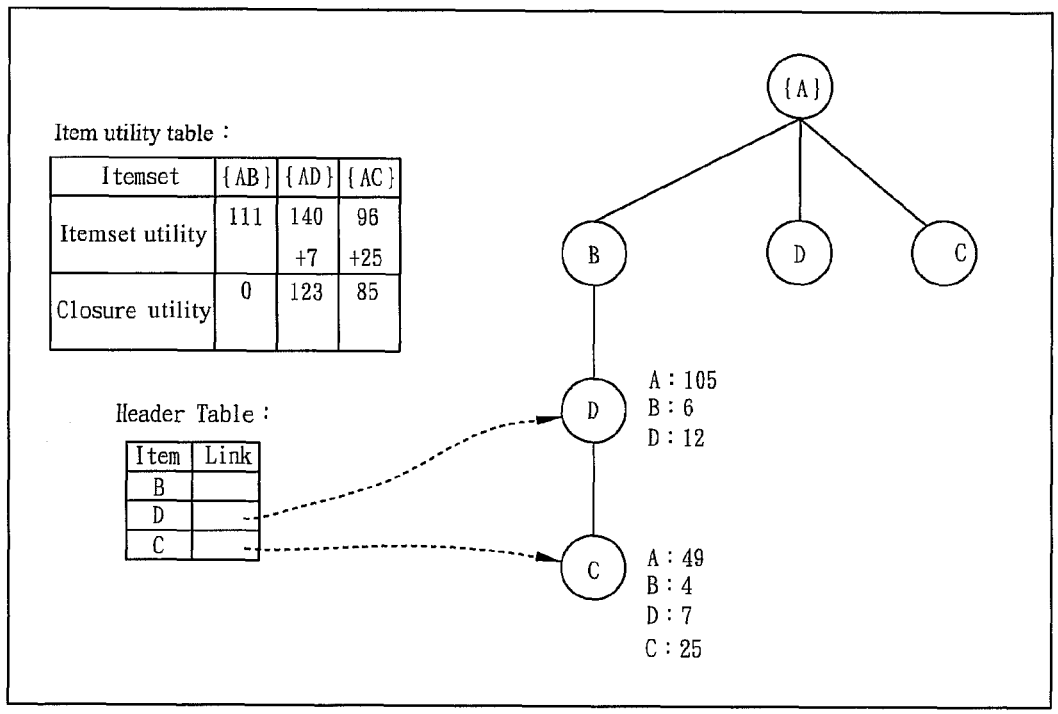
FIG. 9 shows a conditional AM-tree and an item utility table of an itemset {A} according to one embodiment of the present invention.
Figure 10:
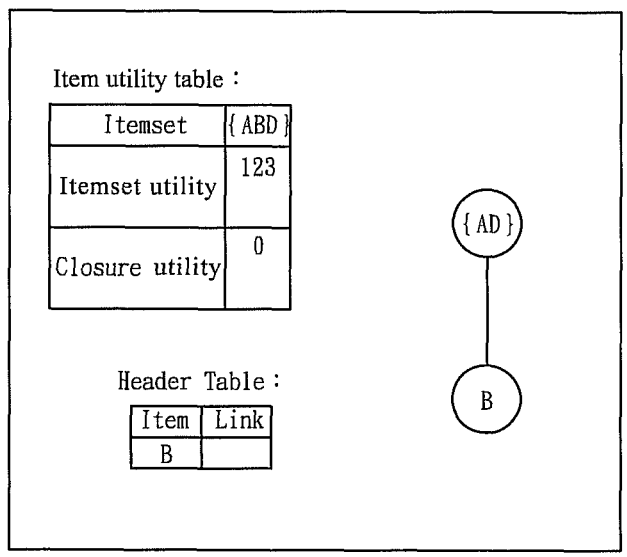
FIG. 10 shows a conditional AM-tree and an item utility table of an itemset {AD} according to one embodiment of the present invention.

From the item utility table in FIG. 9, we can see that both the itemsets $\{AB\}$ and $\{AD\}$ are high utility itemsets respectively having utilities of 111 and 140 and that only the itemset $\{AD\}$ is a high closure utility itemset. Therefore, the AM algorithm continues to construct the conditional AM-Tree and item utility table for the itemset $\{AD\}$, as shown in FIG. 10. The utility of the itemset $\{ADB\}$ is 123, which is a high utility itemset. Because there is no high closure utility itemset further generated, all the high utility itemsets with item $\{A\}$ are $\{AB\}$, $\{AD\}$ and $\{ADB\}$.

Figure 11:
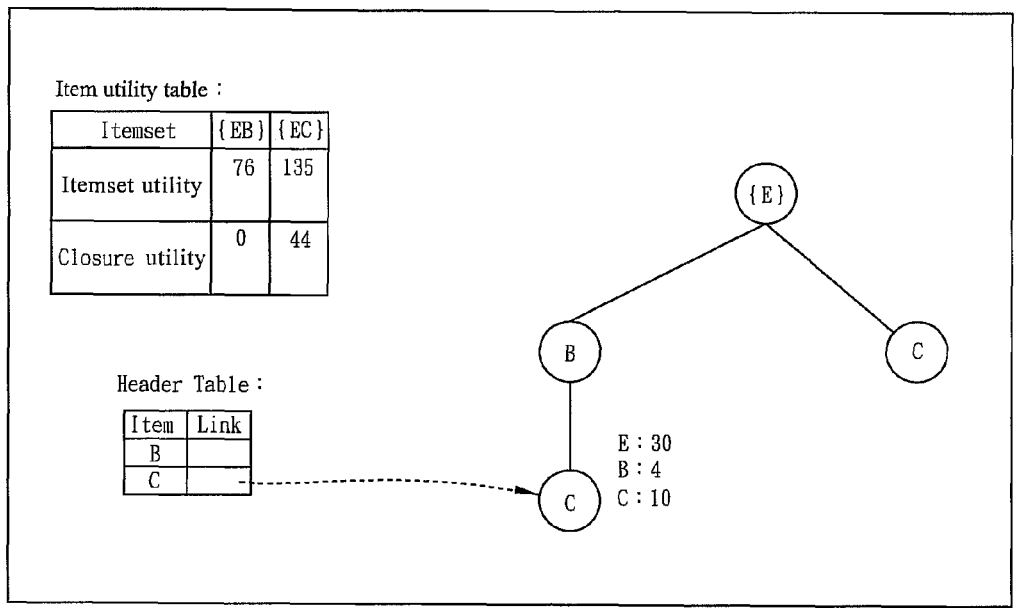
FIG. 11 shows a conditional AM-tree and an item utility table of an itemset {E} according to one embodiment of the present invention.

The AM algorithm continues to construct the conditional AM-Tree and item utility table for another length-1 high closure utility itemset $\{E\}$, which is shown in FIG. 11. From the item utility table, we can see that $\{EC\}$ is a high utility itemset. Since there is not any high closure utility itemset generated further, it is unnecessary to construct any conditional AM-tree further. Thus, the AM algorithm terminates.

For each node N in the AM-tree or conditional AM-tree, except the root node and all the child nodes of the root node, the utilities of all the items on the path from the root to the node N need to be recorded on the node N. Therefore, a large amount of memory space needs to be used. However, most of the nodes in the AM-tree do not need to record this information, since the information recorded on these nodes can be obtained from their descendents.

Figure 12:
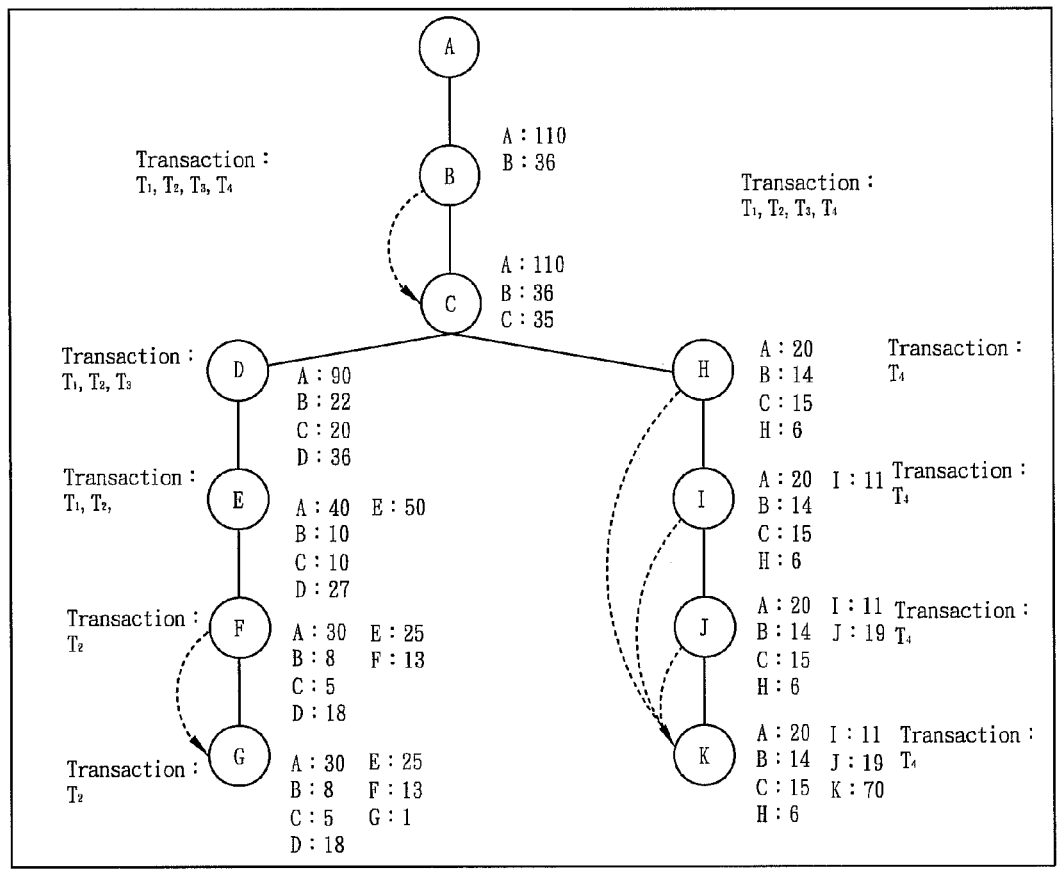
FIG. 12 shows an AM-tree constructed for all transactions in Table.4 according to one embodiment of the present invention.

For example, Table.4 records a transaction database containing more items. FIG. 12 shows an AM-Tree constructed for the transaction database in Table.4, wherein the transaction IDs beside each node are the transactions containing the set of items from the root to the node. From FIG. 12, we can see that the (item: utility) pairs recorded on nodes B and C come from transactions $T_1$, $T_2$, $T_3$ and $T_4$, the (item: utility) pairs recorded on nodes F and G come from transaction $T_2$ and the (item: utility) pairs recorded on nodes H, I, J and K come from Transaction $T_4$. Therefore, the (item: utility) pairs recorded on node B and F can be respectively obtained from nodes C and G. The (item: utility) pairs recorded on nodes H, I and J can be obtained from node K. The (item: utility) pairs only need to be recorded on nodes C, D, E, G and K. We can see in Table 4 that nodes D, E, G and K are respectively the last item nodes of the four transactions and that the node C is a node having two child nodes.

TABLE 4 a transaction database containing more items

|    | A  | B  | C  | D  | E  | F  | G  | H | I  | J  | K  |
|----|----|----|----|----|----|----|----|---|----|----|----|
| T1 | 10 | 2  | 5  | 9  | 25 | 0  | 0  | 0 | 0  | 0  | 0  |
| T2 | 30 | 8  | 5  | 18 | 25 | 13 | 1  | 0 | 0  | 0  | 0  |
| T3 | 50 | 12 | 10 | 9  | 0  | 0  | 0  | 0 | 0  | 0  | 0  |
| T4 | 20 | 14 | 15 | 0  | 0  | 0  | 0  | 6 | 11 | 19 | 70 |

Although the (item: utility) pairs recorded on the node C can be obtained from its child nodes D and H, it is costly to retrieve the information from more than one children. Therefore, the (item: utility) pairs only need to be recorded on the node which contains the last item for a transaction and the node with more than one children. It is not necessary to record the utility information on the other nodes. For the node without recording utility information, a link is created to point to the node in which the necessary utility information is recorded. Because a lot of nodes in the AM-tree or conditional AM-tree do not need to record utility information, the memory space can be effectively reduced. We call the reduced AM-Tree a compressed AM-Tree (CAM-Tree).

The construction of the CAM-Tree is similar to the construction of the AM-Tree. For each transaction $T_i$, which traversals the path: root node→$i_1$→ . . . →$i_n$ according to the original AM-Tree or conditional AM-Tree, if there is no child node $i_1$ for the root node, a path: root node→$i_1$→$i_2$→ . . . →$i_n$ is created and only the last node $i_n$ needs to record the utilities of $i_1$, $i_2$, . . . , and $i_n$ in $T_i$. The AM algorithm creates the reference links for the node $i_k$ ($\forall k$, $2 \le k \le n-1$) to point to node $i_n$, which means that the (item: utility) pairs needed on the node $i_k$ can be retrieved from the node $i_n$. When the jth transaction $T_j$, which traversals the path: root node→$i'_1$→ . . . →$i'_m$, according to the original AM-Tree or conditional AM-tree, is added to the CAM-tree, the item utilities is recorded on the last node $i'_m$. If a node on the path has more than two child nodes or if the node has recorded item utilities, the item utilities need to be added to the node. If the node is a new node, the item utilities of the transaction $T_j$ are directly added to the node. If the node is an old node having not recorded any item utility, the AM algorithm retrieves the item utility that should be recorded on the node through the link, and adds the item utilities in $T_j$ to the retrieved item utilities. If the node from which the item utilities are retrieved is the ancestor of the node to which the item utilities are added, the AM algorithm updates the reference link to point to the node. If the node has recorded item utilities, the AM algorithm directly adds the item utilities in $T_j$ to the node.

Below, we compares the HUC-prune algorithm [2] having the highest efficiency in mining high utility itemsets with the AM algorithm of the present invention. In the comparison, the AM algorithm adopts a CAM-tree. In the comparison, JAVA is used to program the algorithms, and the algorithm program is executed in a computer using an Intel® Core™ 2 Duo P8400 2.4 GHz CPU and 3 GB RAM and running on the Windows XP operating system.

Figure 13:
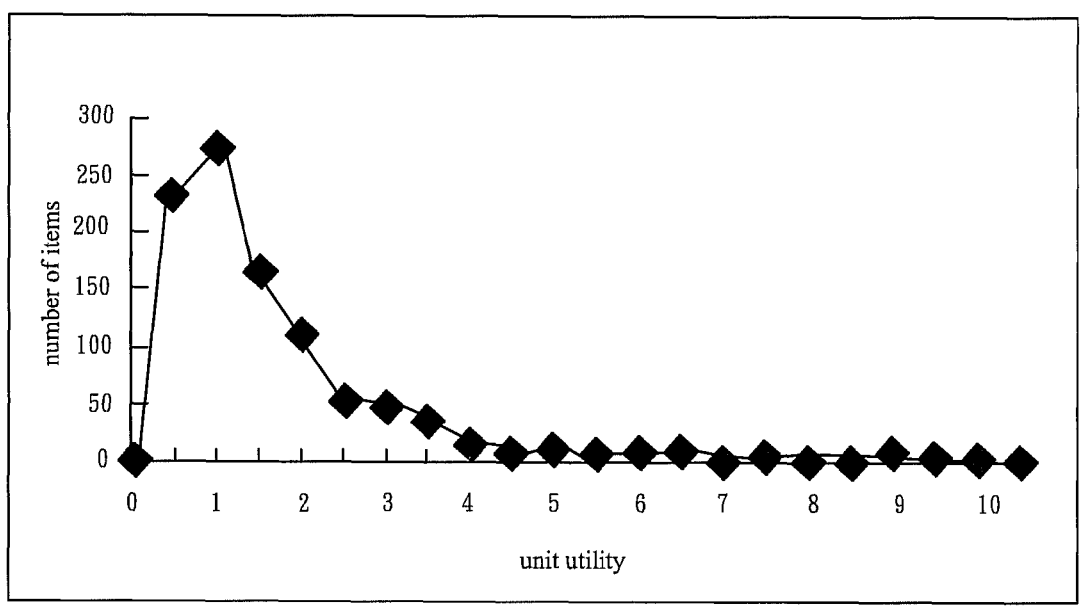
FIG. 13 shows a relationship between unit utility and item number.

In practical transactions, most products have lower benefit, and few products have higher benefit. We refer to the experiments in [2] and [4] and suppose that the utility of an item ranges within 0.01-10 in the log normal distribution, as shown in FIG. 13. The purchased quantity for an item in a transaction is randomly set to between 1 and 10.

We generate two synthetic datasets T10I4D100K and T20I6D100K by using IBM Synthetic Data Generator, wherein T is the average length of the transactions, I is the average size of maximal potential frequent itemsets and D is the total number of transactions. The number of distinct items is set to 1000. For the experiments on the synthetic datasets, we set the utility threshold to be from 0.05% to 0.25%, which is the ratio of the minimum utility MU to the total utility in the dataset, to evaluate the execution times for the HUC-prune algorithm and the AM algorithm. The results of the experiment are shown in FIG. 14 and FIG. 15.

Figure 14:
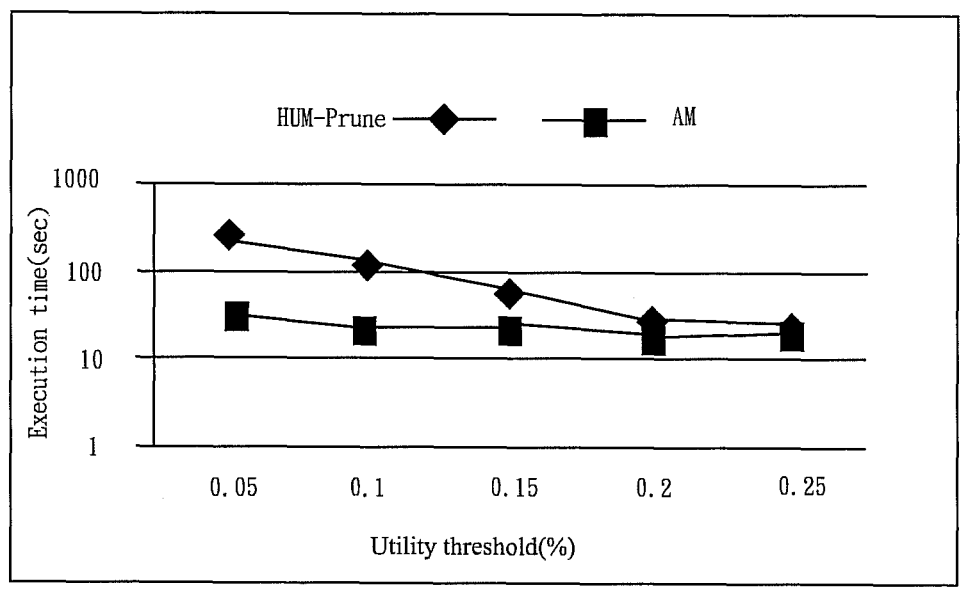
FIG. 14 shows the curves of the execution time of the AM algorithm of the present invention and the HUC-Prune algorithm running on T10I4D100K.
Figure 15:
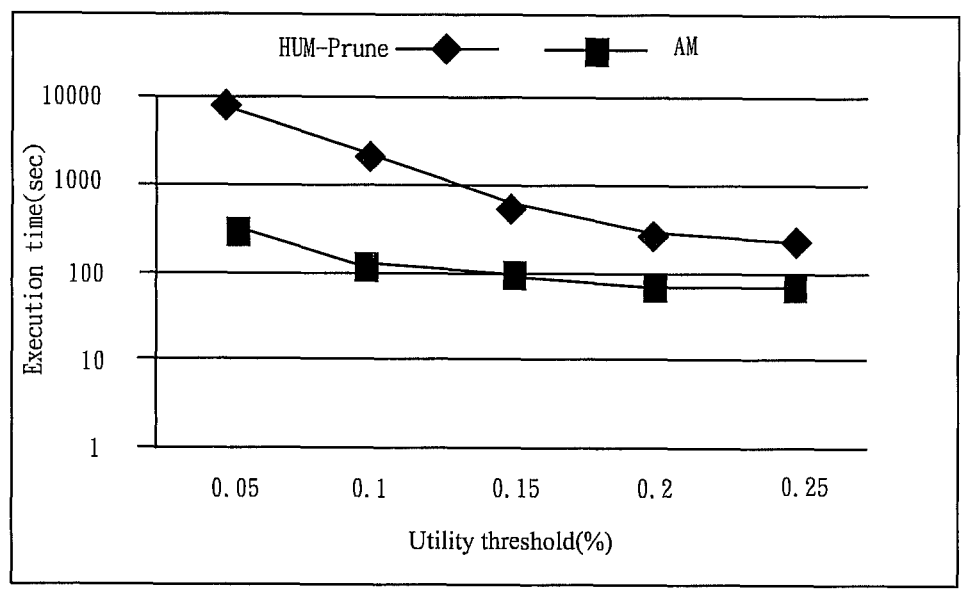
FIG. 15 shows the curves of the execution time of the AM algorithm of the present invention and the HUC-Prune algorithm running on T20I6D 100K.

In FIG. 14 and FIG. 15, we can see that our AM algorithm significantly outperforms the HUC-Prune algorithm. The performance gap increases as the utility threshold decreases because the number of the candidate high utility itemsets for the HUC-Prune algorithm increases with the decreased utility threshold. Therefore, the HUC-Prune algorithm has to take a lot of time to scan the whole database to search all the candidates and compute the utility for each candidate so as to find out the real high utility itemsets.

The AM algorithm of the present invention can directly output high utility itemsets without generating any candidate high utility itemsets.

When the utility threshold decreases, the execution time for the AM algorithm only slightly increases. Thus, the execution efficiency of the AM algorithm is less affected by the utility threshold. Hence, the AM algorithm is more stable than the HUC-Prune algorithm.

Besides, we also evaluate the performance for our AM algorithm on the two real datasets Chess and Mushroom which were downloaded from [7] y comparing our AM algorithm with the HUC-Prune algorithm. There are 3196 transactions in the dataset Chess, in which the average length of the transactions is 76 and the number of the distinct items is 37. There are 8124 transactions in the dataset Mushroom, in which the average length of the transactions is 23 and the number of distinct items is 119. Both Chess and Mushroom are dense datasets, and more itemsets are generated therefrom. Therefore, the HUC-Prune algorithm will generate a great number of candidate high utility itemsets.

Figure 16:
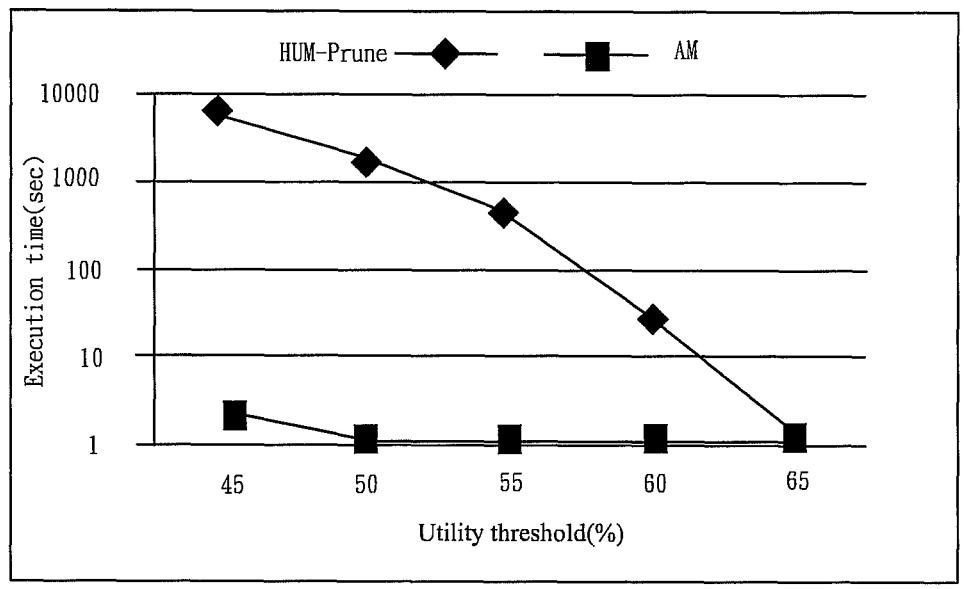
FIG. 16 shows the curves of the execution time of the AM algorithm of the present invention and the HUC-Prune algorithm running on Dataset Chess.
Figure 17:
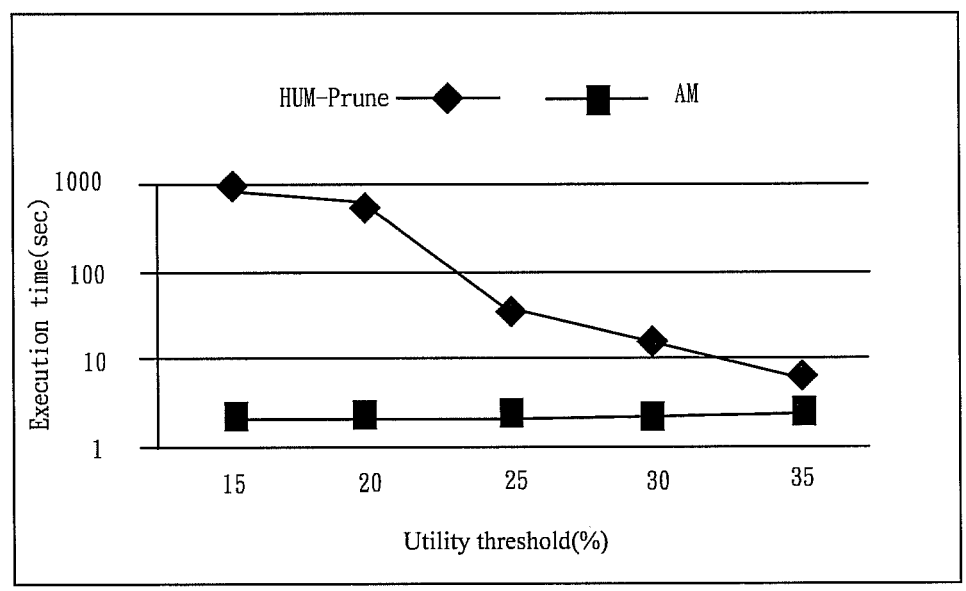
FIG. 17 shows the curves of the execution time of the AM algorithm of the present invention and the HUC-Prune algorithm running on Dataset Mushroom.

The HUC-Prune algorithm has to spend a lot of time in searching for candidate high utility itemsets and computing the real utilities of the candidate high utility itemsets. Nevertheless, the AM algorithm of the present invention needn't generate candidate high utility itemsets. Further, the value of the CU of the closure utility is much smaller than the transaction weighted utility TWU. Therefore, the AM algorithm can fast generate high utility itemsets. FIG. 16 and FIG. 17 show the execution time of the HUC-Prune algorithm and the AM algorithm in two real datasets Chess and Mushroom. From the experimental results, we can see that the execution speed of the AM algorithm is much faster than that of the HUC-Prune algorithm.

Besides, the AM algorithm has superior execution efficiency in dense datasets. Table.5 and Table.6 show that the numbers of the nodes and the numbers of the items recorded the nodes of the uncompressed AM-tree and the compressed AM-tree created for two synthetic datasets.

TABLE 5 status of the nodes and items for T10I4D100K

| Utility threshold | Compressed or not | Total number of created nodes | Total number of recorded items | Average item number per node |
|---|---|---|---|---|
| 0.1% | Yes | 5218678 | 8511708 | 1.63 |
|  | No | 5218678 | 35163105 | 6.74 |
| 0.25% | Yes | 4518598 | 7164362 | 1.58 |
|  | No | 4518598 | 30225517 | 6.69 |

TABLE 6 status of the nodes and items for T 20I6D100K

| Utility threshold | Compressed or not | Total number of created nodes | Total number of recorded items | Average item number per node |
|---|---|---|---|---|
| 0.1% | Yes | 33256222 | 53057257 | 1.60 |
|  | No | 33256222 | 334492599 | 10.06 |
| 0.25% | Yes | 18797426 | 26535897 | 1.41 |
|  | No | 18797426 | 197095642 | 10.48 |

For the uncompressed AM-tree, each node needs to record the items appearing from the root node to the node and the utilities thereof, except the root node and the child nodes thereof. The average number of the items recorded on each node is equal to half the transaction length. Therefore, a great amount of memory space is consumed. For the compressed AM-tree, the root node and the child nodes thereof also needn't record items and utilities. Further, only the node of the last item of a transaction need to record items and utilities except the node has more than two child nodes. Therefore, the compressed AM-tree records much fewer items than the uncompressed AM-tree. Averagely, each node only records the information of 1.6 items in the compressed AM-tree. Consequently, the compressed AM-tree can save a great amount of memory space.

The conventional algorithms for mining high utility itemsets need to operate in two stages. In the first stage, it has to spend a lot of time in finding out candidate high utility itemsets. In the second stage, it spend a lot of time in scanning the database and computing the real utilities of a great number of candidate high utility itemsets so as to find out high utility itemsets. In order to overcome the two-stage problem, the present invention proposes an AM-tree architecture and a definition of closure utility. The present invention also proposes a high-efficiency AM algorithm. The AM algorithm generates a longer high utility itemset via combining the ancestor nodes, i.e. generating a closure superset, which is also defined by the present invention. Thus, the closure utility of an itemset can be used to strictly estimate the real utility of the closure superset. Further, the closure utility of an itemset has a downward closure property. Via computing the closure utility of an itemset and using Theorems 1 and 2, the AM algorithm of the present invention can directly and fast generate all the high utility itemsets without generating candidate high utility itemsets.

The present invention also proposes a compressed AM-tree to save memory space, wherein the information recorded repeatedly in the AM-tree is merged together and retrieved via links, whereby is greatly saved the memory space. The experimental results show that the AM algorithm of the present invention is more efficient and stable than the HUC-Prune algorithm.

The embodiments described above are to demonstrate the technical thoughts and characteristics of the present invention and enable the persons skilled in the art to understand, make and use the present invention. However, it is not intended to limit the scope of the present invention. Any equivalent modification or variation according to the spirit of the present invention is to be also included within the scope of the present invention.

REFERENCE

[1] R. Agrawal, and R. Srikant, "Fast Algorithms for Mining Association Rules," Proc. of 20th International Conference on Very Large Databases, Santiago, Chile, September 1994, pp. 487-499.
[2] C. F. Ahmed, S. K. Tanbeer, B.-S. Jeong and Y.-K. Lee. "An Efficient Candidate Pruning Technique for High Utility Pattern Mining." Proc. of the 13th Pacific-Asia Conference on Knowledge Discovery and Data Mining, April 2009, pp. 749-756.
[3] Jiawei Han, Jian Pei and Yiwen Yin. "Mining Frequent Patterns without Candidate Generation." Proc. of Int. Conf. on Management of Data (ACM SIGMOD), May 2000, pp. 1-12.
[4] Y. Liu, W.-K. Liao and A. Choudhary. "A Fast High Utility Itemsets Mining Algorithm." Proc. of the 1st Int. WorkshopUtility-Based Data Mining, August 2005, pp. 90-(on) 99.
[5] Y.-C. Li, J.-S. Yeh, C.-C. Chang. "Isolated Items Discarding Strategy for Discovering High Utility Itemsets." Data and Knowledge Engineering, vol. 64, no. 1, January 2008, pp. 198-217.
[6] H. Yao, H. J. Hamilton. "Mining itemset utilities from transaction databases." Data and Knowledge Engineering, Vol. 59, 2006, pp. 603-626.
[7] Frequent itemset mining implementations repository, http://fimi.cs.helsinki.fi/

What is claimed is:
1. A computer system comprising:
a computer processor configured to execute a fast algorithm for mining utility itemsets, comprising:
Step (a): undertaking a first database scanning process to compute a transaction weighted utility (TWU) of each item at least one transaction database and a count of appearances of each item, and sorting said items having TWU greater than a minimal utility (MU) according to said counts of appearances from large to small;
Step (b): undertaking a second database scanning process to resort items according to a sequence of said items in a new transaction, computing a utility of each item in said new transaction, deleting items whose TWU is smaller than said MU, recording all items of said new transaction and their utilities, and defining an itemset as a set of said items;
Step (c): establishing an initial absorptive mining (AM) tree, outputting itemsets whose utilities are no less than MU as high utility itemsets;
Step (d): defining a itemset having a closure utility no less than said MU as a high closure utility itemset, checking whether there is a high closure utility itemset whose conditional AM-tree has not been constructed yet; if there is a high closure utility itemset whose conditional AM-tree has not been constructed, executing Step (e); if there is no high closure utility itemset whose conditional AM-tree has not been constructed, executing Step (f);

Step (e): establishing a conditional AM-tree for said high closure utility itemset, outputting all said high utility itemsets in said conditional AM-tree, generating other possible high closure utility itemsets, and returning to Step (d); and Step (f): completing generation of all said high utility itemsets and terminating the process.

2. The computer system that executes the fast algorithm for mining high utility itemsets according to claim 1, wherein in said Step (a), some of said items are sorted in alphabetic order if said items have an identical count of appearances.

3. The computer system that executes the fast algorithm for mining high utility itemsets according to claim 1, wherein a transaction closure section $TCS(T_q, X)$ for an itemset in a transaction $X=\{x_1, \ldots, x_n\}$ is a union of $T_q \supseteq X$ and all items in $T_q$, whose order are less than that of $x_j (\forall j, 1 \leq j \leq n)$, which is shown by an expression: $TCS(Tq, X)=\{i|i \in Tq^- \text{ order}(i) < \text{order}(x_1)\} \cup X$, and wherein if $\|TCS(Tq, X)\| \neq \|X\|$, $TCS(T_q, X)$ is a real transaction closure section of X.

4. The computer system that executes the fast algorithm for mining high utility itemsets according to claim 3, wherein a transaction closure utility $TCU(T_q, X)$ for an itemset X in a transaction $T_q$ is a sum of utilities of all items in $TCS(T_q, X)$, which is shown by an expression:

$$TCU(T_q, X) = \sum_{i_p \in TCS(T_q, X) \wedge |TCS(T_q, X)| \neq |X|} u(i_p, T_q).$$

5. The computer system that executes the fast algorithm for mining high utility itemsets according to claim 4, wherein said closure utility CU(X) of an itemset X in a transaction database D is a sum of transaction closure utilities for an itemset X in all transactions in D, which is shown by an expression:

$$CU_{(X)} = \sum_{X \subseteq T_q \in D} TCU(T_q, X).$$

6. The computer system that executes the fast algorithm for mining high utility itemsets according to claim 1, wherein a closure superset of an itemset X having a length of k is $X \cup \{y\}$ wherein y is an item $\notin X$ and order of y is smaller than that of $x_i (1 \leq i \leq k)$, and wherein a closure subset of an itemset X is $X - \{x_{min}\}$, wherein $x_{min}$ is an item whose order is the smallest.

7. The computer system that executes the fast algorithm for mining high utility itemsets according to claim 1, wherein in said Step (c), each of said high utility itemsets has a length of 1.

8. The computer system that executes the fast algorithm for mining high utility itemsets according to claim 1, wherein in said Step (c), establishing said initial AM tree further comprising:

Step (1): retrieving transaction data and inputting a first transaction $T_1=\{i_1, i_2, \ldots, i_n\}$;

Step (2): creating a child node $i_1$ of a root node and a child node $i_{j+1}(\forall j, 1 \leq j \leq n-1)$ of said node $i_j$, and record $\{i_1:u(i_1, T_1), i_2:u(i_2, T_1), \ldots, i_k:u(i_k, T_1)\}$ on a node $i_k$ ($2 \leq k \leq n$);

Step (3): recording a utility and a transaction closure utility of each item in $T_1$ into an item utility table;

Step (4): checking whether there is a next transaction $T_j=\{j_1, j_2, \ldots, j_m\}$ further comprises:

Step (i): If there is no next transaction, output the items appearing in said item utility table and having item utility greater than MU to form high utility itemsets, and executing Step (5); and Step (ii): If there is a next transaction, checking whether said root node has a child node $j_1$; if said root node does not have a child node $j_1$, returning to Step (1); if said root node has a child node $j_1$, let k=1; checking whether a node $j_k$ has a child node $j_{k+1}$ until all said node $j_k$ have been check; respectively adding a transaction closure utility and a utility of each item $j_k$ ($1 \leq k \leq m$) in said transaction $T_j$ to a closure utility and a utility of said item $j_k$, which are recorded on said item utility table, and returning to Step (4); and Step (5): retrieving item utilities from all nodes of a link of an item x, which appears in said item utility table and belongs to a high closure utility itemset, and starting from said item x to form an item x-related sub-database to complete said initial AM tree.

9. The computer system that executes the fast algorithm for mining high utility itemsets according to claim 8, wherein in said Step (ii), checking whether said node $j_k$ has a child node $j_{k+1}$ further comprises:

if said node $j_k$ has a child node $j_{k+1}$, respectively add utilities of $j_k$ and $j_{k+1}$ in said transaction $T_j$ to utilities of $j_1, \ldots, j_k$ and $j_{k+1}$, which are recorded on said child node $j_{k+1}$; adding 1 to k; checking whether k=m; if k≠m returning to said Step (ii); if k=m, it meaning that all said nodes $j_k$ have been checked; and if said node $j_k$ does not have a child node $j_{k+1}$, creating a child node $j_{k+1}$ of said node $j_k$; recording utilities of $j_1, \ldots, j_k$ and $j_{k+1}$ in said transaction $T_j$ on said child node $j_{k+1}$; adding 1 to k; checking whether k=m; if k≠m, returning to said Step (ii); if k=m, it meaning that all said nodes $j_k$ have been checked.

10. The computer system that executes the fast algorithm for mining high utility itemsets according to claim 8, wherein said Step (5) includes arranging each piece of data in said sub-database in form of $\{x:u_x, i_1:u_1, \ldots, i_n: u_n\}$, which is prepared to construct said conditional AM-tree of said itemset $\{x\}$.

11. The computer system that executes the fast algorithm for mining high utility itemsets according to claim 1, wherein in said Step (e), establishing said conditional AM-tree further comprises:

Step (1): retrieving transaction data, and inputting data of a first transaction $T_1=\{x_1, x_2, \ldots, x_k, i_1, i_2, \ldots, i_n\}$;

Step (2): creating a child node $i_1$ of a root node and a child node $i_{j+1}(\forall j, 1 \leq j \leq n-1)$ of node $i_j$, and recording $(x_1:u(x_1, T_1), x_2:u(x_2, T_1), \ldots, x_k:u(x_k, T_1), i_1:u(i_1, T_1), i_2:u(i_2, T_1) \ldots, i_k:u(i_k, T_1))$ on a node $i_k$ ($2 \leq k \leq n$);

Step (3): recording utility and transaction closure utility of each itemset $X \cup \{i_k\}(\forall k, 1 \leq k \leq n)$ into an item utility table;

Step (4): checking whether there is a next transaction $T_j=\{x_1, x_2, \ldots, x_k, j_1, j_2, \ldots j_m\}$ further comprises:

Step (i): if there is no next transaction, outputting itemset appearing in said item utility table and having item utility greater than MU as said high utility itemsets, and executing said Step (5); and Step (ii): if there is a next transaction, checking whether said root node has a child node $j_1$; if said root node does not have a child node $j_1$, returning to said Step (1); if said root node has a child node $j_1$, letting k=1;

checking whether said node $j_k$ has a child node $j_{k+1}$ until all said nodes $j_k$ have been checked;

respectively adding transaction closure utilities and utilities of $\{x_1, x_2, \ldots, x_k, j_1, \ldots, j_k, j_{k+1}\}$ in said transaction $T_j$ to closure utilities and utilities of each itemset $X \cup \{j_k\}$ recorded on said item utility table; returning to said Step (4); and Step (5): retrieving item utilities recorded on all nodes of a link of an item x, which appears in the item utility table and belongs to a high closure utility itemset, and starting from said itemset y to form a sub-database related with said itemset $Xy = \{y, x_1, x_2, \ldots, x_k\}$, and completing said conditional AM-tree.

12. The computer system that executes the fast algorithm for mining high utility itemsets according to claim 11, wherein in said Step (ii), checking whether said node $j_k$ has a child node $j_{k+1}$ further comprises:

if said node $j_k$ has a child node $j_{k+1}$, respectively adding utilities of $x_1, x_2, \ldots, x_k, j_1, \ldots, j_{k+1}$ in said transaction to utilities of $x_1, x_2, \ldots, x_k, j_1, \ldots, j_k, j_{k+1}$ recorded on said child node $j_{k+1}$; adding 1 to k; checking whether k=m; if k≠m, returning to said Step (ii); if k=m, it meaning that all said nodes $j_k$ have been checked; and if said node $j_k$ does not have a child node $j_{k+1}$, creating a child node $j_{k+1}$ of said node $j_k$; recording the utilities of $x_1, x_2, \ldots, x_k, j_1, \ldots, j_k, j_{k+1}$ in said transaction $T_1 = \{x_1, x_2, \ldots, x_k, j_1, \ldots, j_k, j_{k+1}\}$ on said child node $i_{k+1}$; add 1 to k; checking whether k=m; if k≠m, returning to said Step (ii); if k=m, it meaning that all said nodes $j_k$ have been checked.

13. The computer system that executes the fast algorithm for mining high utility itemsets according to claim 11, wherein said Step (5) includes arranging each piece of data in said sub-database in form of $\{y:u_y, x_1:u_{x1}, \ldots, x_k:u_{xk}, i_1:u_1, \ldots, i_n:u_n\}$, which is prepared to construct said conditional AM-tree of said itemset $Xy = \{y, x_1, x_2, \ldots, x_k\}$.

14. The computer system that executes the fast algorithm for mining high utility itemsets according to claim 1, wherein said initial AM tree or said conditional AM tree may be a compressed AM tree.

15. The computer system that executes the fast algorithm for mining high utility itemsets according to claim 14, wherein establishing said compressed AM tree comprises:

Step (1): retrieving transaction data, and inputting data of a first transaction $T_1$, which traversals the path: root $\rightarrow i_1 \rightarrow \ldots \rightarrow i_n$ according to said initial AM tree or said conditional AM tree;

Step (2): creating a child node $i_1$ of a root node and a child node $i_{j+1}(\forall j, 1 \leq n-1)$ of node $i_j$; recording necessary item utilities on the last node $i_n$; pointing a link of a node $i_k$ ($\forall k, 2 \leq n-1$) to said node $i_n$;

Step (3): recording utility and transaction closure utility of each item in said transaction $T_1$ into an item utility table;

Step (4): checking whether there is a next transaction $T_j$, which traversals the path: root node $\rightarrow i'_1 \rightarrow \ldots \rightarrow i'_m$ according to said initial AM tree or said conditional AM tree; if there is a next transaction, executing the next step; if there is no next transaction, terminating the process;

Step (5): checking whether said root node has a child node $i'_1$; if said root node does not have a child node $i'_1$, returning to said Step (1) for retrieving another piece of transaction data; if said root node has a child node $i'_1$, it meaning that a path: root node $\rightarrow i'_1 \rightarrow \ldots \rightarrow i'_j$ ($1 \leq j \leq m$) has existed and that said child node $i'_{j+1}$ of said node $i'_j$ does not exist; adding utilities of items of transactions to nodes in said path, which have recorded item utilities; supposing that there is a node $i'_p$ that is the last one of nodes recording item utilities in said path; if there is no node recording item utilities in said path, it meaning that said node $i'_p$ does not exist; supposing that said node $i'_p$ is a node $i'_1$; executing the next step;

Step (6): checking whether said node has recorded item utilities further comprising:

Step (i): if said node $i'_j$ has recorded item utilities, directly adding necessary utilities to said node $i'_j$; and Step (ii): if said node $i'_j$ has not recorded item utilities yet, retrieving utility information from nodes recording necessary item utilities through the link; adding utilities of said transaction to said node $i'_j$; pointing a link of a node $i'_k(\forall j, p<k \leq j-1)$ to said node $i'_j$;

Step (7): checking whether m>j; if m>j, executing Step (8); if m≯j, directly executing Step (9);

Step (8): creating a child node $i'_k$ ($\forall j, j<k \leq m-1$); of said node, respectively recording utilities of all the items in said transaction $T_j$ on said node $i'_m$; creating at said node $i'_k(\forall k, j<k \leq m-1)$ a link pointing to said node $i'_m$; and Step (9): recording utility and transaction closure utility of each itemset in said transaction $T_j$ into said item utility table; returning to said Step (4).

16. A method for constructing a compressed absorptive mining tree structure used in a data mining algorithm, the method performed by a computing device comprising a computer processor, comprising:

Step (1): retrieving transaction data, and inputting data of a first transaction $T_1$, which traversals the path: root node $\rightarrow i_1 \rightarrow \ldots \rightarrow i_n$ according to said initial AM tree or said conditional AM tree;

Step (2): creating a child node $i_1$ of a root node and a child node $i_{j+1}(\forall j, 1 \leq j \leq n-1)$ of said node $i_j$; recording necessary item utilities on the last node $i_n$; pointing a link of a node $i_k(\forall k, 2 \leq k \leq n-1)$ to said node $i_n$;

Step (3): recording utility and transaction closure utility of each item in said transaction $T_1$ into an item utility table;

Step (4): checking whether there is a next transaction $T_j$, which traversals the path: root node $\rightarrow i'_1 \rightarrow \ldots \rightarrow i'_m$ according to said initial AM tree or said conditional AM tree; if there is a next transaction, executing the next step; if there is no next transaction, terminating the process;

Step (5): checking whether said root node has a child node $i'_1$; if said root node does not have a child node returning to Step (1) for retrieving another piece of transaction data; if said root node has a child node $i'_1$ meaning that a path: root node $\rightarrow i'_1 \rightarrow \ldots \rightarrow i'_j$ ($1 \leq j \leq m$) has existed and that said child node $i'_{j+1}$ of said node $i'_j$ does not exist; adding utilities of items of transactions to nodes in said path, which have recorded item utilities; supposing that there is a node $i'_p$ that is the last one of nodes recording item utilities in said path; if there is no node recording item utilities in said path, it meaning that said node $i'_p$ does not exist; supposing that said node $i'_p$ is a node $i'_1$; executing the next step;

Step (6): checking whether said node $i'_j$ has recorded item utilities further comprising:

Step (i): if said node $i'_j$ has recorded item utilities, directly adding necessary utilities to said node $i'_j$; and Step (ii): if said node has not recorded item utilities yet, retrieving utility information from nodes recording necessary item utilities through the link; adding utilities of said transaction to said node $i'_j$; pointing a link of a node $i'_k(\forall k, p<k \leq j-1)$ to said node $i'_j$;

Step (7): checking whether m>j; if m>j, executing Step (8); if m⍴j, directly executing Step (9);

Step (8): creating a child node $i'_{k+1}$ of said node $i'_k$ ($\forall k$, j<k≤m−1); respectively recording utilities of all the items in said transaction $T_j$ on said node $i'_m$; creating at said node $i_k$ ($\forall k$, j<k≤m−1) a link pointing to said node $i'_m$; and Step (9): recording utility and transaction closure utility of each itemset in said transaction $T_j$ into said item utility table; returning to Step (4).

* * * * *